(12) United States Patent
Sim et al.

(10) Patent No.: US 12,418,655 B2
(45) Date of Patent: Sep. 16, 2025

(54) DECODING DEVICE AND METHOD FOR PREDICTING BLOCK PARTITIONED INTO RANDOM SHAPE

(71) Applicants: HYUNDAI MOTOR COMPANY, Seoul (KR); KIA CORPORATION, Seoul (KR); KWANGWOON UNIVERSITY INDUSTRY-ACADEMIC COLLABORATION FOUNDATION, Seoul (KR)

(72) Inventors: Dong Gyu Sim, Seoul (KR); Joo Hyung Byeon, Seoul (KR); Jong Seok Lee, Seoul (KR); Seung Wook Park, Yongin-si (KR); Wha Pyeong Lim, Hwaseong-si (KR)

(73) Assignees: HYUNDAI MOTOR COMPANY, Seoul (KR); KIA CORPORATION, Seoul (KR); KWANGWOON UNIVERSITY INDUSTRY-ACADEMIC COLLABORATION FOUNDATION, Seoul (KR)

( * ) Notice: Subject to any disclaimer, the term of this patent is extended or adjusted under 35 U.S.C. 154(b) by 70 days.

(21) Appl. No.: 17/785,509

(22) PCT Filed: Dec. 15, 2020

(86) PCT No.: PCT/KR2020/018369
§ 371 (c)(1),
(2) Date: Jun. 15, 2022

(87) PCT Pub. No.: WO2021/125751
PCT Pub. Date: Jun. 24, 2021

(65) Prior Publication Data
US 2023/0048262 A1     Feb. 16, 2023

(30) Foreign Application Priority Data

Dec. 16, 2019   (KR) .................. 10-2019-0168016
Jan. 9, 2020   (KR) .................. 10-2020-0003143
Dec. 15, 2020   (KR) .................. 10-2020-0175629

(51) Int. Cl.
H04N 19/132     (2014.01)
H04N 19/105     (2014.01)
(Continued)

(52) U.S. Cl.
CPC ......... H04N 19/132 (2014.11); H04N 19/105 (2014.11); H04N 19/159 (2014.11);
(Continued)

(58) Field of Classification Search
CPC .. H04N 19/132; H04N 19/105; H04N 19/159; H04N 19/176; H04N 19/70;
(Continued)

(56) References Cited

U.S. PATENT DOCUMENTS 9,571,830 B2   2/2017   Song et al.
9,686,562 B2   6/2017   Song et al.
(Continued)

FOREIGN PATENT DOCUMENTS

CN    110063056 A    7/2019
KR    101712156 B1    3/2017
(Continued)

OTHER PUBLICATIONS

Benjamin Bross, Versatile Video Coding (Draft 7), JVET-P2001-vE. Joint Video Experts Team (JVET) of ITU-T SG 16 WP 3 and ISO/IEC JTC 1/SC 29/WG 11 16th Meeting: Geneva, CH. Oct. 2019. 491pp.
(Continued)

Primary Examiner — Richard T Torrente
(74) Attorney, Agent, or Firm — Lempia Summerfield Katz LLC

(57) ABSTRACT

A method and a device for inversely transforming transform coefficients of a current block are disclosed. A method for predicting a current block according to a first mode, includes the steps of: on the basis of a partition mode syntax element, partitioning the current block into non-rectangular blocks; determining an intra-predicted intra block and an inter-predicted inter block among the non-rectangular blocks; and
(Continued)

deriving prediction samples of a first area including the inter block on the basis of motion information, and deriving prediction samples of a second area including the intra block on the basis of an intra prediction mode.

15 Claims, 19 Drawing Sheets

(51) Int. Cl.
  *H04N 19/159* (2014.01)
  *H04N 19/176* (2014.01)
  *H04N 19/70* (2014.01)
  *G06T 9/40* (2006.01)
(52) U.S. Cl.
  CPC .......... *H04N 19/176* (2014.11); *H04N 19/70* (2014.11); *G06T 9/40* (2013.01)
(58) Field of Classification Search
  CPC .... H04N 19/11; H04N 19/197; H04N 19/593; H04N 19/82; H04N 19/86; H04N 19/119; H04N 19/117
  See application file for complete search history.

(56) References Cited

U.S. PATENT DOCUMENTS

| | | |
|---|---|---|
| 9,900,610 B2 | 2/2018 | Song et al. |
| 11,140,387 B2 | 10/2021 | Lee |
| 11,716,467 B2 | 8/2023 | Lee |
| 11,736,686 B2 | 8/2023 | Lee |
| 2005/0259730 A1 | 11/2005 | Sun |
| 2013/0266067 A1 | 10/2013 | Song et al. |
| 2014/0064369 A1 | 3/2014 | Laroche |
| 2015/0264352 A1 | 9/2015 | Yie et al. |
| 2017/0041607 A1 | 2/2017 | Song et al. |
| 2017/0251219 A1 | 8/2017 | Song et al. |
| 2018/0249156 A1 | 8/2018 | Heo et al. |
| 2020/0077089 A1 | 3/2020 | Lee |
| 2021/0250581 A1* | 8/2021 | Xu .................... H04N 19/119 |
| 2021/0409697 A1 | 12/2021 | Lee |
| 2022/0053185 A1 | 2/2022 | Lee |
| 2022/0070448 A1* | 3/2022 | Kim .................... H04N 19/577 |
| 2022/0086441 A1* | 3/2022 | Zhang ................. H04N 19/176 |
| 2022/0103833 A1* | 3/2022 | Blasi .................... H04N 19/17 |
| 2022/0103854 A1 | 3/2022 | Chiang |
| 2023/0336717 A1 | 10/2023 | Lee |

FOREIGN PATENT DOCUMENTS

| | | |
|---|---|---|
| KR | 20170023921 A | 3/2017 |
| KR | 20180041211 A | 4/2018 |
| KR | 20180084659 A | 7/2018 |
| WO | 2020156464 A1 | 8/2020 |

OTHER PUBLICATIONS

European Search Report in corresponding European app No. EP 20902924.8; Nov. 17, 2023; 13 pp.

Saverio Blasi et al., CE4-6: Combination of geometric partitioning and CIIP, JVET-Q0078. Joint Video Experts Team (JVET) of ITU-T SG 16 WP 3 and ISO/IEC JTC 1/SC 29/WG 11 17th Meeting: Brussels, BE. Dec. 24, 2019. 3pp.

Saverio Blasi et al., Non-CE4: CIIP using triangular partitions, JVET-O0522. Joint Video Experts Team (JVET) of ITU-T SG 16 WP 3 and ISO/IEC JTC 1/SC 29/WG 11 15th Meeting: Gothenburg, SE. Jul. 9, 2019. 10pp.

Semih Esenlik et al., Non-CE4: Geometrical partitioning for inter blocks, JVET-O0489-v4. Joint Video Experts Team (JVET) of ITU-T SG 16 WP 3 and ISO/IEC JTC 1/SC 29/WG 11 15th Meeting: Gothenburg, SE. Jul. 7, 2019. 9pp.

International Search Report and Written Opinion cited in corresponding international app No. PCT/KR2020/018369; Mar. 11, 2021; 6 pp.

Office Action cited in Chinese patent application No. 202080086347. 6; Jul. 29, 2024; 18 pp.

* cited by examiner (A)   (B)

(A)

(B)

(C)

0 : Planar
1 : DC

| 0 | −1 | 0 |
|---|---|---|
| 0 | 0 | 0 |
| 0 | +1 | 0 |

(A)

| 0 | 0 | 0 |
|---|---|---|
| −1 | 0 | +1 |
| 0 | 0 | 0 |

(B)

| −1 | 0 | 0 |
|---|---|---|
| 0 | 0 | 0 |
| 0 | 0 | +1 |

(C)

| 0 | 0 | −1 |
|---|---|---|
| 0 | 0 | 0 |
| +1 | 0 | 0 |

|   |    |   |
|---|----|---|
| 0 | -1 | 0 |
| 0 | 2  | 0 |
| 0 | -1 | 0 |

(A)

|    |   |    |
|----|---|----|
| 0  | 0 | 0  |
| -1 | 2 | -1 |
| 0  | 0 | 0  |

(B)

|    |   |    |
|----|---|----|
| -1 | 0 | 0  |
| 0  | 2 | 0  |
| 0  | 0 | -1 |

(C)

|    |   |    |
|----|---|----|
| 0  | 0 | -1 |
| 0  | 2 | 0  |
| -1 | 0 | 0  |

DECODING DEVICE AND METHOD FOR PREDICTING BLOCK PARTITIONED INTO RANDOM SHAPE

CROSS-REFERENCE TO RELATED APPLICATION

This application is a U.S. national stage of International Application No. PCT/KR2020/018369, filed on Dec. 15, 2020, which claims priority to Korean Patent Application No. 10-2019-0168016, filed on Dec. 16, 2019, Korean Patent Application No. 10-2020-0003143, filed on Jan. 9, 2020, and Korean Patent Application No. 10-2020-0175629, filed on Dec. 15, 2020, the entire contents of each of which are incorporated herein by reference.

TECHNICAL FIELD

The present disclosure relates to the encoding and decoding of a video and, more particularly, to a method and an apparatus for further improving efficiency of encoding and decoding by performing inter prediction and intra prediction on a block partitioned in a given shape.

BACKGROUND

Since video data has a large data volume compared to audio data or still image data, it requires a lot of hardware resources, including memory, to store or transmit the data in its raw form before undergoing a compression process.

Accordingly, storing or transmitting video data typically accompanies compression thereof by using an encoder before a decoder can receive, decompress, and reproduce the compressed video data. Existing video compression technologies include H.264/AVC and High Efficiency Video Coding (HEVC), which improves the encoding efficiency of H.264/AVC by about 40%.

However, the constant increase of video images in size, resolution, and frame rate and the resultant increase of data amount to be encoded require a new and superior compression technique with better encoding efficiency and higher image quality improvement over existing compression techniques.

SUMMARY

In order to meet such requirements, an object of the present disclosure is to provide an improved encoding and decoding technology. In particular, an aspect of the present disclosure is related to a technology for improving efficiency of encoding and decoding by classifying non-rectangular blocks, which are partitioned from one block, into a block for inter prediction and a block for intra prediction.

Furthermore, another aspect of the present disclosure is related to a technology for improving efficiency of encoding and decoding by simplifying an adaptive filtering process.

According to an aspect, the present disclosure provides a method of predicting a current block based on a first mode. The method comprises: partitioning the current block into non-rectangular blocks based on a partition mode syntax element; determining an intra block to be intra-predicted and an inter block to be inter-predicted among the non-rectangular blocks; deriving prediction samples of a first area including the inter block based on motion information; and deriving prediction samples of a second area including the intra block based on an intra prediction mode.

According to another aspect, the present disclosure provides a decoding apparatus for predicting a current block based on a first mode. The apparatus comprises an entropy decoder and a predictor. The entropy decoder is configured to partition the current block into non-rectangular blocks based on a partition mode syntax element. The predictor is configured to determine an intra block to be intra-predicted and an inter block to be inter-predicted among the non-rectangular blocks, derive prediction samples of a first area including the inter block based on motion information, and derive prediction samples of a second area including the intra block based on an intra prediction mode.

The present disclosure can further expand its applicability compared to a conventional method of performing only inter prediction because intra prediction, not inter prediction, can be performed on a non-rectangular block.

Furthermore, the present disclosure can improve performance of intra prediction because intra prediction of another non-rectangular block can be performed with reference to an inter prediction value of any non-rectangular block.

Moreover, the present disclosure can effectively remove discontinuity occurring in a block edge by applying a weight to an inter prediction value and an intra prediction value based on prediction types of neighbor blocks.

Moreover, the present disclosure can improve bit efficiency because a determination of an inter block and an intra block, whether to perform a blending process, and whether to apply deblocking filtering can be determined based on a 1-bit flag.

Moreover, the present disclosure can improve efficiency of encoding and decoding because adaptive filtering can be simplified by integrating a feature extraction process of a sample adaptive offset and a feature extraction process of adaptive loop filtering.

BRIEF DESCRIPTION OF THE DRAWINGS

FIGS. 19A and 19B are diagrams for describing a primary differential filter and a secondary differential filter.

FIGS. 20A and 20B are diagrams in which reconstructed samples are divided in directions.

DESCRIPTION OF EMBODIMENTS

Figure 1:
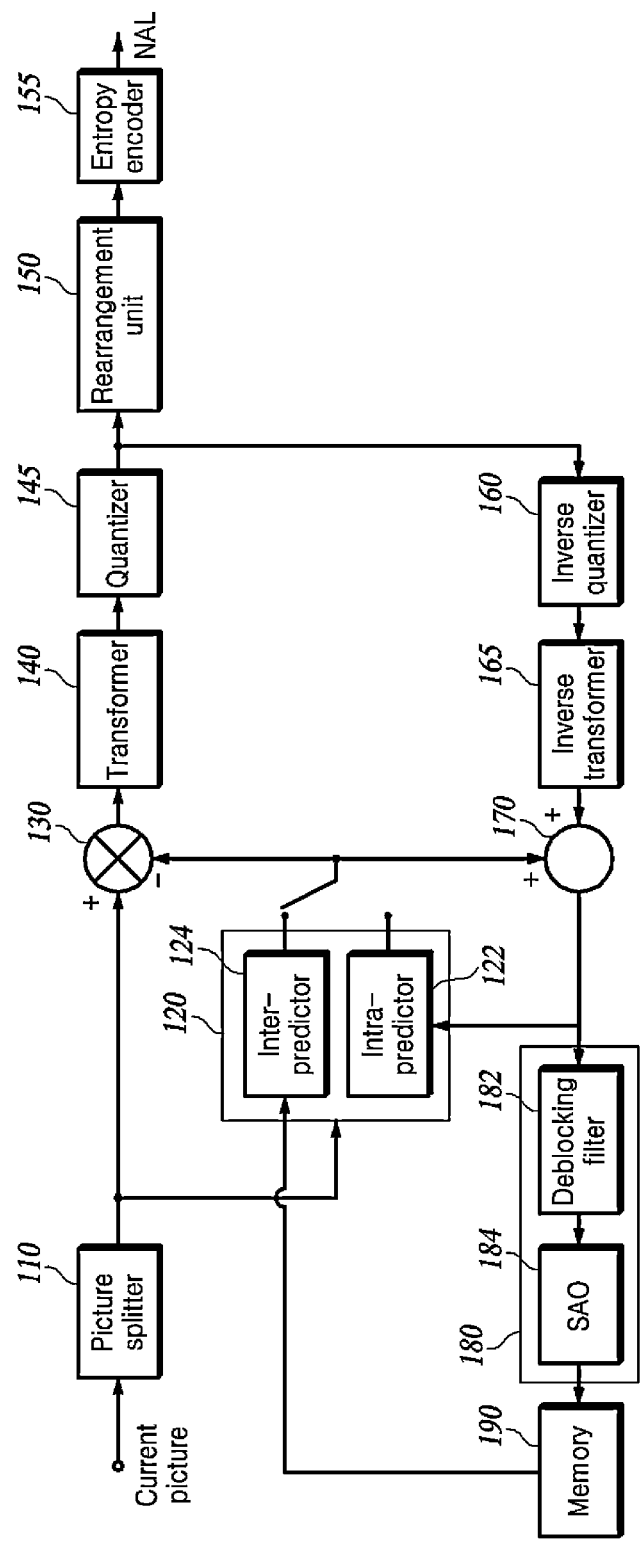
FIG. 1 is a block diagram illustrating a video encoding apparatus that can implement the techniques of the present disclosure.

Hereinafter, some embodiments of the present disclosure are described in detail with reference to the accompanying drawings. In the following description, like reference numerals designate like elements, although the elements are shown in different drawings. Further, in the following description of some embodiments, a detailed description of related known components and functions when considered to obscure the subject of the present disclosure has been omitted for the purpose of clarity and for brevity. When a component, device, element, or the like of the present disclosure is described as having a purpose or performing an operation, function, or the like, the component, device, or element should be considered herein as being "configured to" meet that purpose or to perform that operation or function.

FIG. 1 is a block diagram illustrating a video encoding apparatus that can implement the techniques of the present disclosure. Hereinafter, a video encoding apparatus and elements of the apparatus are described with reference to FIG. 1.

The video encoding apparatus includes a picture splitter 110, a predictor 120, a subtractor 130, a transformer 140, a quantizer 145, a rearrangement unit 150, an entropy encoder 155, an inverse quantizer 160, an inverse transformer 165, an adder 170, a filter unit 180, and a memory 190.

Each element of the video encoding apparatus may be implemented in hardware or software, or a combination of hardware and software. The functions of the respective elements may be implemented as software and a microprocessor may be implemented to execute the software functions corresponding to the respective elements.

One video includes a plurality of pictures. Each picture is split into a plurality of regions, and encoding is performed on each region. For example, one picture is split into one or more tiles or/and slices. Here, the one or more tiles may be defined as a tile group. Each tile or slice is split into one or more coding tree units (CTUs). Each CTU is split into one or more coding units (CUs) by a tree structure. Information applied to each CU is encoded as a syntax of the CU and information applied to CUs included in one CTU in common is encoded as a syntax of the CTU. In addition, information applied to all blocks in one slice in common is encoded as a syntax of a slice header and information applied to all blocks constituting a picture is encoded in a picture parameter set (PPS) or a picture header. Furthermore, information, which a plurality of pictures refers to in common, is encoded in a sequence parameter set (SPS). In addition, information referred to by one or more SPSs in common is encoded in a video parameter set (VPS). Information applied to one tile or tile group in common may be encoded as a syntax of a tile or tile group header.

The picture splitter 110 determines the size of a coding tree unit (CTU). Information about the size of the CTU (CTU size) is encoded as a syntax of the SPS or PPS and is transmitted to the video decoding apparatus.

The picture splitter 110 splits each picture constituting the video into a plurality of CTUs having a predetermined size and then recursively splits the CTUs using a tree structure. In the tree structure, a leaf node serves as a coding unit (CU), which is a basic unit of coding.

The tree structure may be a QuadTree (QT), in which a node (or parent node) is split into four sub-nodes (or child nodes) of the same size. The tree structure may be a BinaryTree (BT), in which a node is split into two sub-nodes. The tree structure may be a TernaryTree (TT), in which a node is split into three sub-nodes at a ratio of 1:2:1. The tree structure may be a structure formed by a combination of two or more of the QT structure, the BT structure, and the TT structure. For example, a QuadTree plus BinaryTree (QTBT) structure may be used, or a QuadTree plus BinaryTree TernaryTree (QTBTTT) structure may be used. Here, BTTT may be collectively referred to as a multiple-type tree (MTT).

Figure 2:
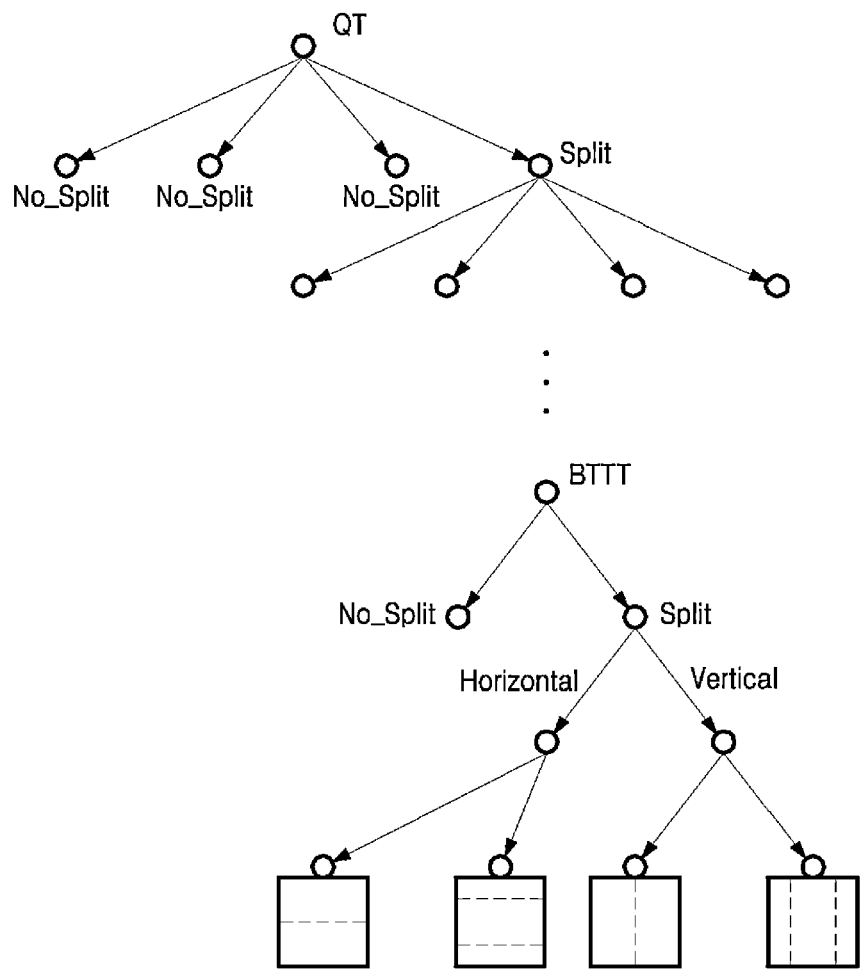
FIG. 2 is a diagram for explaining a method of splitting a block by using a QTBTTT structure.

FIG. 2 shows a QTBTTT splitting tree structure. As shown in FIG. 2, a CTU may be initially split in the QT structure. The QT splitting may be repeated until the size of the splitting block reaches the minimum block size MinQT-Size of a leaf node allowed in the QT. A first flag (QT_split_flag) indicating whether each node of the QT structure is split into four nodes of a lower layer is encoded by the entropy encoder 155 and signaled to the video decoding apparatus. When the leaf node of the QT is not larger than the maximum block size (MaxBTSize) of the root node allowed in the BT, it may be further split into one or more of the BT structure or the TT structure. The BT structure and/or the TT structure may have a plurality of splitting directions. For example, there may be two directions, namely, a direction in which a block of a node is horizontally split and a direction in which the block is vertically split. As shown in FIG. 2, when MTT splitting is started, a second flag (mtt_split_flag) indicating whether nodes are split, a flag indicating a splitting direction (vertical or horizontal) in the case of splitting, and/or a flag indicating a splitting type (Binary or Ternary) are encoded by the entropy encoder 155 and signaled to the video decoding apparatus.

Alternatively, prior to encoding the first flag (QT_split_flag) indicating whether each node is split into 4 nodes of a lower layer, a CU splitting flag (split_cu_flag) indicating whether the node is split may be encoded. When the value of the CU split flag (split_cu_flag) indicates that splitting is not performed, the block of the node becomes a leaf node in the splitting tree structure and serves a coding unit (CU), which is a basic unit of encoding. When the value of the CU split flag (split_cu_flag) indicates that splitting is performed, the video encoding apparatus starts encoding the flags in the manner described above, starting with the first flag.

When QTBT is used as another example of a tree structure, there may be two splitting types including a type of horizontally splitting a block into two blocks of the same size (i.e., symmetric horizontal splitting) and including a type of vertically splitting a block into two blocks of the same size (i.e., symmetric vertical splitting). A split flag (split_flag) indicating whether each node of the BT structure is split into block of a lower layer and splitting type information indicating the splitting type are encoded by the entropy encoder 155 and transmitted to the video decoding apparatus. There may be an additional type of splitting a block of a node into two asymmetric blocks. The asymmetric splitting type may include a type of splitting a block into two rectangular blocks at a size ratio of 1:3, or a type of diagonally splitting a block of a node.

CUs may have various sizes according to QTBT or QTBTTT splitting of a CTU. Hereinafter, a block corresponding to a CU (i.e., a leaf node of QTBTTT) to be encoded or decoded is referred to as a "current block." As QTBTTT splitting is employed, the shape of the current block may be square or rectangular.

The predictor 120 predicts the current block to generate a prediction block. The predictor 120 includes an intra-predictor 122 and an inter-predictor 124.

In general, each of the current blocks in a picture may be predictively coded. In general, prediction of a current block is performed using an intra-prediction technique (using data from a picture containing the current block) or an inter-prediction technique (using data from a picture coded before a picture containing the current block). The inter-prediction includes both unidirectional prediction and bi-directional prediction.

Figure 3A:
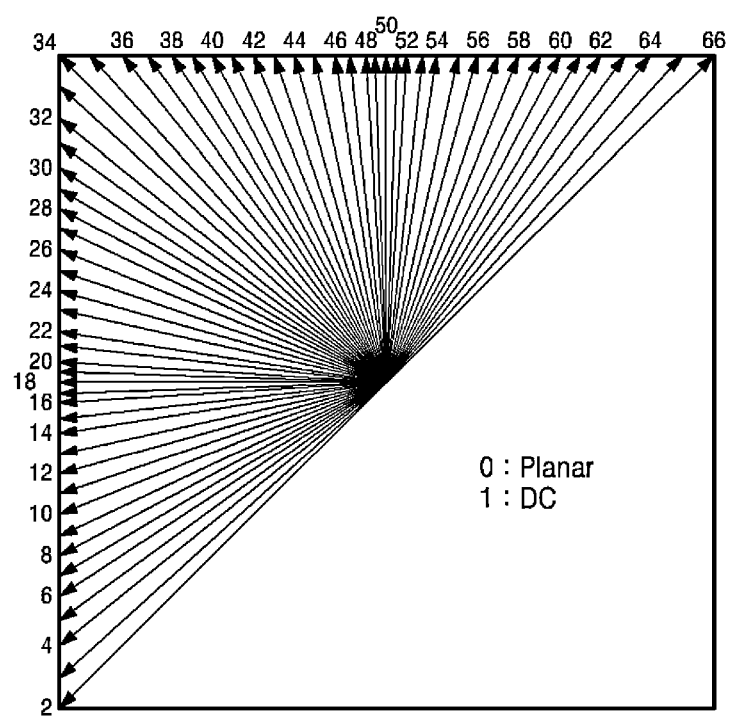
FIG. 3A is a diagram illustrating a plurality of intra-prediction modes.

The intra-prediction unit 122 predicts pixels in the current block using pixels (reference pixels) positioned around the current block in the current picture including the current block. There is a plurality of intra-prediction modes according to the prediction directions. For example, as shown in FIG. 3A, the plurality of intra-prediction modes may include two non-directional modes, which include a planar mode and a DC mode, and 65 directional modes. Neighboring pixels and an equation to be used are defined differently for each prediction mode. The table below lists intra-prediction mode numbers and names thereof.

Figure 3B:
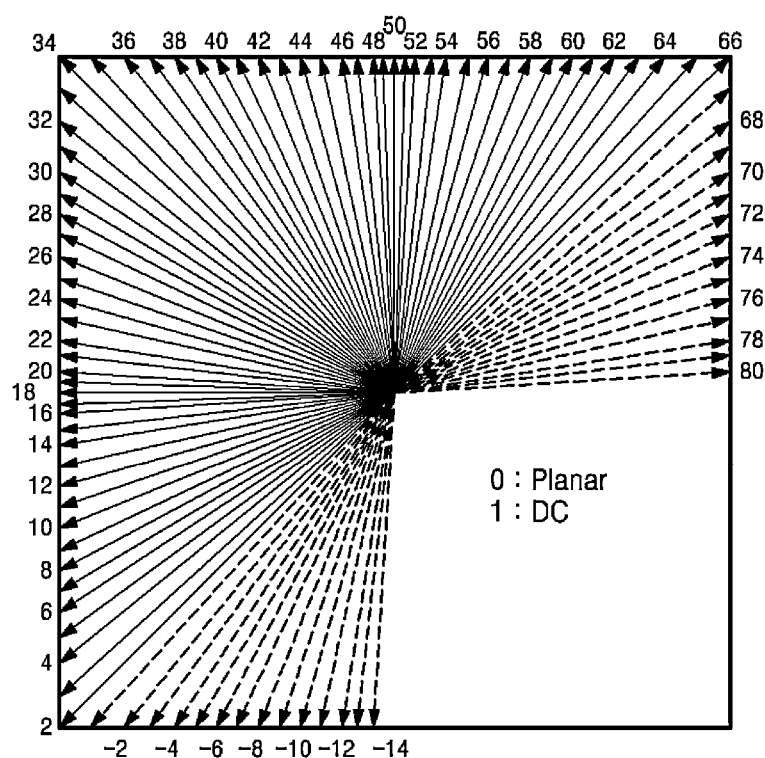
FIG. 3B is a diagram illustrating a plurality of intra-prediction modes including wide-angle intra-prediction modes.

For efficient directional prediction for a rectangular-shaped current block, directional modes (intra-prediction modes 67 to 80 and −1 to −14) indicated by dotted arrows in FIG. 3B may be additionally used. These modes may be referred to as "wide angle intra-prediction modes." In FIG. 3B, arrows indicate corresponding reference samples used for prediction, not indicating prediction directions. The prediction direction is opposite to the direction indicated by an arrow. A wide-angle intra prediction mode is a mode in which prediction is performed in a direction opposite to a specific directional mode without additional bit transmission when the current block has a rectangular shape. In this case, among the wide angle intra-prediction modes, some wide angle intra-prediction modes available for the current block may be determined based on a ratio of the width and height of the rectangular current block. For example, wide angle intra-prediction modes with an angle less than 45 degrees (intra prediction modes 67 to 80) may be used when the current block has a rectangular shape with a height less than the width thereof. Wide angle intra-prediction modes with an angle greater than −135 degrees (intra-prediction modes −1 to −14) may be used when the current block has a rectangular shape with width greater than the height thereof.

The intra-predictor 122 may determine an intra-prediction mode to be used in encoding the current block. In some examples, the intra-predictor 122 may encode the current block using several intra-prediction modes and select an appropriate intra-prediction mode to use from the tested modes. For example, the intra-predictor 122 may calculate rate distortion values using rate-distortion analysis of several tested intra-prediction modes and may select an intra-prediction mode that has the best rate distortion characteristics among the tested modes.

The intra-predictor 122 selects one intra-prediction mode from among the plurality of intra-prediction modes and predicts the current block using neighboring pixels (reference pixels) and an equation determined according to the selected intra-prediction mode. Information about the selected intra-prediction mode is encoded by the entropy encoder 155 and transmitted to the video decoding apparatus.

The inter-predictor 124 generates a prediction block for the current block through motion compensation. The inter-predictor 124 searches for a block most similar to the current block in a reference picture, which has been encoded and decoded earlier than the current picture. The inter-predictor 124 generates a prediction block for the current block using the searched block. Then, the inter-predictor generates a motion vector corresponding to a displacement between the current block in the current picture and the prediction block in the reference picture. In general, motion estimation is performed on a luma component, and a motion vector calculated based on the luma component is used for both the luma component and the chroma component. The motion information including information about the reference picture and information about the motion vector used to predict the current block is encoded by the entropy encoder 155 and transmitted to the video decoding apparatus.

The subtractor 130 subtracts the prediction block generated by the intra-predictor 122 or the inter-predictor 124 from the current block to generate a residual block.

The transformer 140 partitions the residual block into one or more transform blocks, performs a transform on the transform blocks, and transforms the residual values of the transform blocks from a pixel domain into a frequency domain. In the frequency domain, the transform blocks are referred to as coefficient blocks containing one or more transform coefficient values. A two-dimensional (2D) transform kernel may be used for the transform, and a one-dimensional (1D) transform kernel may be used for each of horizontal transform and vertical transform. The transform kernels may be based on a discrete cosine transform (DCT), a discrete sine transform (DST), or the like.

The transformer 140 may transform the residual signals in a residual block by using the entire size of the residual block as a transform unit. Also, the transformer 140 may partition the residual block into two sub-blocks in a horizontal or vertical direction and may perform the transform on only one of the two sub-blocks. Accordingly, the size of the transform block may be different from the size of the residual block (and thus the size of a prediction block). Non-zero residual sample values may be absent or very sparse in untransformed sub-block. Residual samples of the untransformed sub-block may not be signaled and may all be regarded as "0" by a video decoding apparatus. Several partition types may be present depending on a partitioning direction and a partitioning ratio. The transformer 140 may provide information on a coding mode (or a transform mode) of the residual block (e.g., the information on the coding mode includes information indicating whether the residual block is transformed or the sub-block of the residual block is transformed, information indicating a partition type selected to partition the residual block into the sub-blocks, information for identifying the sub-block to be transformed, etc.) to the entropy encoder 155. The entropy encoder 155 may encode the information on a coding mode (or a transform mode) of a residual block.

The quantizer 145 quantizes transform coefficients output from the transformer 140 and outputs quantized transform coefficients to the entropy encoder 155. The quantizer 145 may directly quantize a related residual block for a certain block or frame without transform.

The rearrangement unit 150 may perform rearrangement of the coefficient values with the quantized transform coefficients. The rearrangement unit 150 may use coefficient scanning for changing the two-dimensional coefficient array into a one-dimensional coefficient sequence. For example, the rearrangement unit 150 may scan coefficients from a DC coefficient toward coefficients in a high-frequency region through a zig-zag scan or a diagonal scan to output a one-dimensional coefficient sequence. Depending on the size of the transform unit and the intra-prediction mode, the zig-zag scan used may be replaced by a vertical scan for scanning the two-dimensional coefficient array in a column direction and a horizontal scan for scanning the two-dimensional block shape coefficients in a row direction. In other words, a scanning method to be used may be determined among a zig-zag scan, a diagonal scan, a vertical scan, and a horizontal scan according to the size of the transform unit and the intra-prediction mode.

The entropy encoder 155 encodes a sequence of the one-dimensional quantized transform coefficients outputted from the rearrangement unit 150 by using various encoding methods such as Context-based Adaptive Binary Arithmetic Code (CABAC), Exponential Golomb, and the like, encoding to generate a bitstream.

The entropy encoder 155 encodes information such as a CTU size, a CU split flag, a QT split flag, an MTT splitting type, and an MTT splitting direction, which are associated with block splitting, such that the video decoding apparatus may split the block in the same manner as in the video encoding apparatus. In addition, the entropy encoder 155 encodes information about a prediction type indicating whether the current block is encoded by intra-prediction or inter-prediction. The entropy encoder 155 also encodes intra-prediction information (i.e., information about an intra-prediction mode) or inter-prediction information (information about a reference picture index and a motion vector) according to the prediction type.

The inverse quantizer 160 inversely quantizes the quantized transform coefficients output from the quantizer 145 to generate transform coefficients. The inverse transformer 165 transforms the transform coefficients output from the inverse quantizer 160 from the frequency domain to the spatial domain and reconstructs the residual block.

The adder 170 adds the reconstructed residual block to the prediction block generated by the predictor 120 to reconstruct the current block. The pixels in the reconstructed current block are used as reference pixels in performing intra-prediction of a next block.

The filter unit 180 filters the reconstructed pixels to reduce blocking artifacts, ringing artifacts, and blurring artifacts generated due to block-based prediction and transform/quantization. The filter unit 180 may include a deblocking filter 182 and a pixel adaptive offset (SAO) filter 184.

The deblocking filter 180 filters the boundary between the reconstructed blocks to remove blocking artifacts caused by block-by-block coding/decoding, and the SAO filter 184 performs additional filtering on the deblocking-filtered video. The SAO filter 184 is a filter used to compensate for a difference between a reconstructed pixel and an original pixel caused by lossy coding.

The reconstructed blocks filtered through the deblocking filter 182 and the SAO filter 184 are stored in the memory 190. Once all blocks in one picture are reconstructed, the reconstructed picture may be used as a reference picture for inter-prediction of blocks in a picture to be encoded next.

Figure 4:
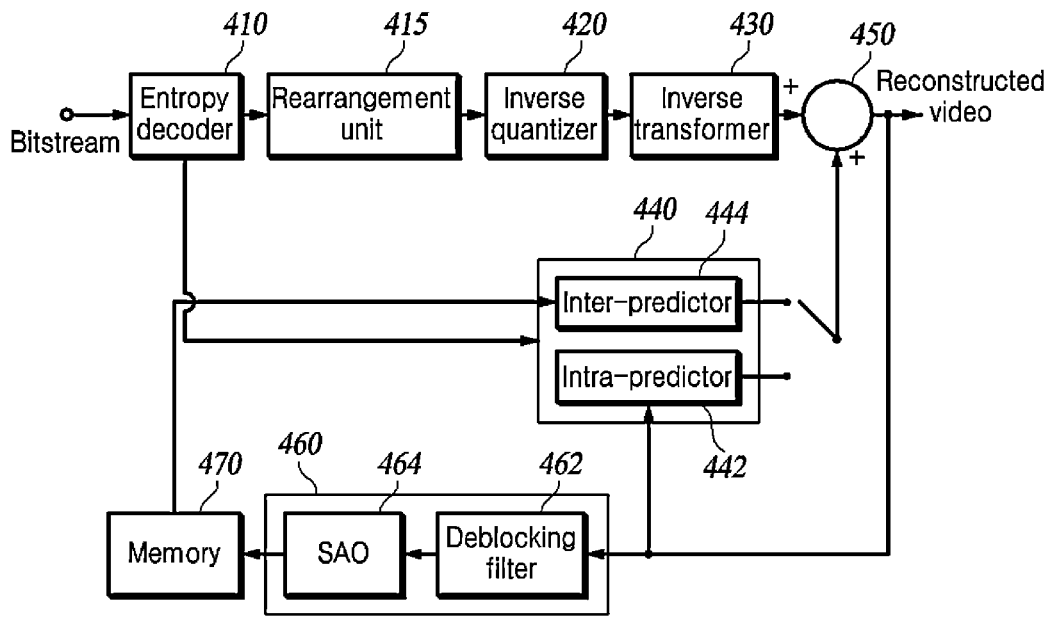
FIG. 4 is a block diagram illustrating a video decoding apparatus that can implement the techniques of the present disclosure.

FIG. 4 is a functional block diagram of a video decoding apparatus capable of implementing the techniques of the present disclosure. Hereinafter, the video decoding apparatus and its components are described with reference to FIG. 4.

The video decoding apparatus may include an entropy decoder 410, a rearrangement unit 415, an inverse quantizer 420, an inverse transformer 430, a predictor 440, an adder 450, a filter unit 460, and a memory 470.

Similar to the video encoding apparatus of FIG. 1, each element of the video decoding apparatus may be implemented in hardware, software, or a combination of hardware and software. Further, the function of each element may be implemented in software, and the microprocessor may be implemented to execute the function of software corresponding to each element.

The entropy decoder 410 determines a current block to be decoded by decoding a bitstream generated by the video encoding apparatus and extracting information related to block splitting and extracts prediction information and information about a residual signal, and the like required to reconstruct the current block.

The entropy decoder 410 extracts information about the CTU size from the sequence parameter set (SPS) or the picture parameter set (PPS), determines the size of the CTU, and splits a picture into CTUs of the determined size. Then, the decoder determines the CTU as the uppermost layer, i.e., the root node of a tree structure, and extracts splitting information about the CTU to split the CTU using the tree structure.

For example, when the CTU is split using a QTBTTT structure, a first flag (QT_split_flag) related to splitting of the QT is extracted to split each node into four nodes of a sub-layer. For a node corresponding to the leaf node of the QT, the second flag (MTT_split_flag) and information about a splitting direction (vertical/horizontal) and/or a splitting type (binary/ternary) related to the splitting of the MTT are extracted to split the corresponding leaf node in the MTT structure. Thus, each node below the leaf node of QT is recursively split in a BT or TT structure.

As another example, when a CTU is split using the QTBTTT structure, a CU split flag (split_cu_flag) indicating whether to split a CU may be extracted. When the corresponding block is split, the first flag (QT_split_flag) may be extracted. In the splitting operation, zero or more recursive MTT splitting may occur for each node after zero or more recursive QT splitting. For example, the CTU may directly undergo MTT splitting without the QT splitting or undergo only QT splitting multiple times.

As another example, when the CTU is split using the QTBT structure, the first flag (QT_split_flag) related to QT splitting is extracted, and each node is split into four nodes of a lower layer. Then, a split flag (split_flag) indicating whether a node corresponding to a leaf node of QT is further split in the BT and the splitting direction information are extracted.

Once the current block to be decoded is determined through splitting in the tree structure, the entropy decoder 410 extracts information about a prediction type indicating whether the current block is intra-predicted or inter-predicted. When the prediction type information indicates intra-prediction, the entropy decoder 410 extracts a syntax element for the intra-prediction information (intra-prediction mode) for the current block. When the prediction type information indicates inter-prediction, the entropy decoder 410 extracts a syntax element for the inter-prediction information, i.e., information indicating a motion vector and a reference picture referred to by the motion vector.

Meanwhile, the entropy decoder 410 extracts the information on a coding mode of a residual block (e.g., information on whether a residual block is encoded or only a sub-block of a residual block is encoded, information indicating a partition type selected to partition a residual bock into sub-blocks, information for identifying encoded residual sub-blocks, quantization parameters, etc.) from a bitstream. Also, the entropy decoder 410 extracts information on quantized transform coefficients of the current block as information regarding a residual signal.

The rearrangement unit 415 may change the sequence of the quantized 1D transform coefficients entropy-decoded by the entropy decoder 410 back into a 2D array of coefficients (i.e., a block) in the reverse order of coefficient scanning performed by the video encoding apparatus.

The inverse quantizer 420 inversely quantizes the quantized transform coefficients. The inverse transformer 430 generates a reconstructed residual block for the current block by reconstructing residual signals by inversely transforming the inversely quantized transform coefficients from a frequency domain to a spatial domain on the basis of the information on a coding mode of a residual block.

When the information on a coding mode of a residual block indicates that a residual block of the current block is encoded in the video encoding apparatus, the inverse transformer 430 generates a reconstructed residual block for the current block by performing inverse transform on the inversely quantized transform coefficients using the size of the current block (and thus the size of a residual block to be restored) as a transform unit.

Also, when the information on a coding mode of a residual block indicates that only one sub-block of a residual block is encoded in the video encoding apparatus, the inverse transformer 430 generates a reconstructed residual block for the current block by reconstructing residual signals for a transformed sub-block through inverse transform on the inversely quantized transform coefficients using the size of the transformed sub-block as a transform unit and by setting residual signals for an untransformed sub-block to "0."

The predictor 440 may include an intra-predictor 442 and an inter-predictor 444. The intra-predictor 442 is activated when the prediction type of the current block is intra-prediction, and the inter-predictor 444 is activated when the prediction type of the current block is inter-prediction.

The intra-predictor 442 determines an intra-prediction mode of the current block among a plurality of intra-prediction modes based on the syntax element for the intra-prediction mode extracted from the entropy decoder 410 and predicts the current block using the reference pixels around the current block according to the intra-prediction mode.

The inter-predictor 444 determines a motion vector of the current block and a reference picture referred to by the motion vector using the syntax element for the inter-prediction mode extracted from the entropy decoder 410 and predicts the current block based on the motion vector and the reference picture.

The adder 450 reconstructs the current block by adding the residual block output from the inverse transformer 430 and the prediction block output from the inter-predictor 444 or the intra-predictor 442. The pixels in the reconstructed current block are used as reference pixels in intra-predicting a block to be decoded next.

The filter unit 460 may include a deblocking filter 462 and an SAO filter 464. The deblocking filter 462 deblocking-filters the boundary between the reconstructed blocks to remove blocking artifacts caused by block-by-block decoding. The SAO filter 464 performs additional filtering on the reconstructed block after deblocking filtering to corresponding offsets so as to compensate for a difference between the reconstructed pixel and the original pixel caused by lossy coding. The reconstructed block filtered through the deblocking filter 462 and the SAO filter 464 is stored in the memory 470. When all blocks in one picture are reconstructed, the reconstructed picture is used as a reference picture for inter-prediction of blocks in a picture to be encoded next.

The encoding apparatus and the decoding apparatus may partition a current block into blocks having a rectangular shape and may partition a current block into blocks having a triangular shape in order to increase prediction performance. To this end, the encoding apparatus and the decoding apparatus may also support a triangle partition mode (TPM).

Figure 5:
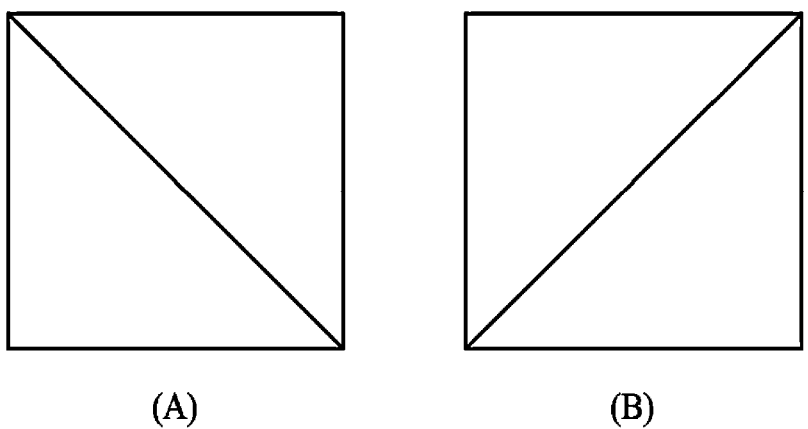
FIG. 5 is a diagram for describing a triangle partition mode.

In the TPM, as shown in FIG. 5, the encoding apparatus partitions a current block into two triangle blocks and performs inter prediction on each of the triangle blocks based on a merge mode. The encoding apparatus encodes a syntax element indicating any one of two partition forms (a partition in a right-down diagonal direction (FIG. 5(A)) and a partition in a right-up diagonal direction (FIG. 5(B)) and a merge index (motion information) for each of triangle blocks. Then, the encoding apparatus signals them to the decoding apparatus. The decoding apparatus partitions a current block into triangle blocks by using the syntax element indicating a partition form and performs inter prediction on each of the triangle blocks based on the signaled merge index. The encoding apparatus and the decoding apparatus may additionally perform blending on a partition edge in order to remove the discontinuity of samples values occurring in the partition edge.

However, as resolution of an image is gradually increased, the size of a prediction block is also increased. Accordingly, block partition having more various shapes (e.g., a given shape or a non-rectangular shape) and the application of an intra prediction to a partitioned block is required.

The present disclosure proposes a method of partitioning a current block into non-rectangular blocks and a method of applying intra prediction to non-rectangular blocks in addition to inter prediction. The method of the present disclosure may be denoted as a GIIP mode (geometrical partitioning for intra and inter prediction) or a first mode.

Figure 6:
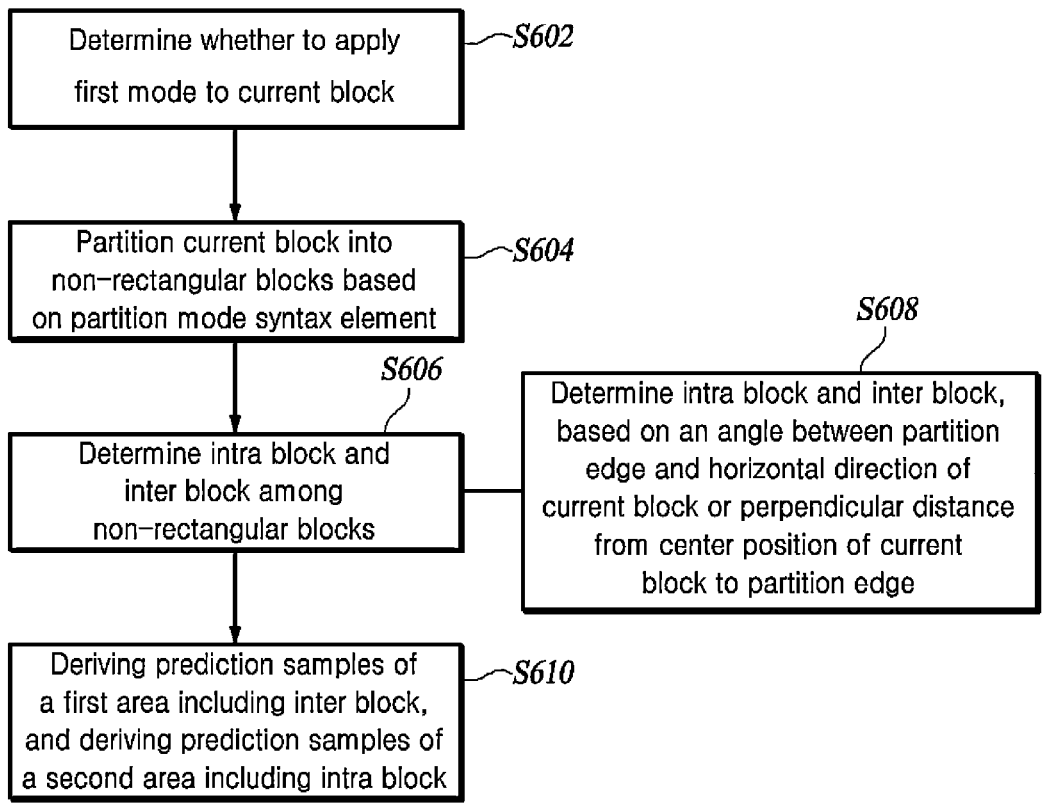
FIG. 6 is a flowchart for describing an example of a method of predicting a current block based on a first mode proposed in the present disclosure.

A flowchart of an example of a method proposed in the present disclosure is illustrated in FIG. 6.

1. Block Partition

The encoding apparatus may partition a current block into non-rectangular blocks, may encode a partition mode syntax element indicating a structure in which the non-rectangular blocks are partitioned, and may signal the partition mode syntax element to the decoding apparatus. The entropy decoder 410 may decode the partition mode syntax element from a bitstream and may partition a current block into non-rectangular blocks based on the decoded partition mode syntax element (S604).

Figure 7:
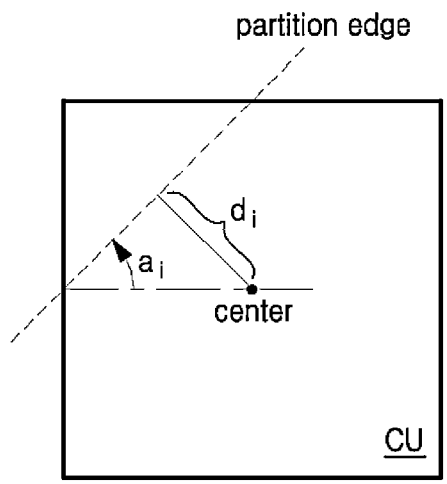
FIG. 7 is a diagram for describing a partition edge.

In the example of FIG. 7, a partition edge or boundary may be determined by a perpendicular distance ($d_i$) from the center of a current block (CU) to the partition edge and an angle ($a_i$) formed by the partition edge and a horizontal direction of the current block. $a_i$ may have a value between 0 to 360 degrees. $d_{max}$, i.e., a maximum value of $d_i$ may be determined as in Equation 1 based on $a_i$ and the width (w) and height (h) of the current block.

$$d_{max}(\varphi, w, h) = \cos\varphi\left(\frac{h}{2\tan\left(\frac{\pi}{2} - \varphi\right)} + \frac{w}{2}\right) - b,$$ [Equation 1]

$$0 < \varphi < \frac{\pi}{2},$$

$$0 < b < d_{max}$$

In Equation 1, φ indicates the angle ($a_i$) from a horizontal axis to a block edge. The subtraction of b is for preventing a corner and the block edge of the current block from becoming too close to each other.

A partition mode syntax element may directly indicate $a_i$ and $d_i$ or may be an index indicating the partition edge of the current block among preset values of $a_i$ and $d_i$. If the partition mode syntax element is implemented as an index, the encoding apparatus and the decoding apparatus may determine $a_i$ and $d_i$ corresponding to an index indicated by the partition mode syntax element by using a lookup table for preset values of $a_i$ and $d_i$.

2. Determine Whether to Perform GIIP Mode

According to an embodiment, before the process S604 is performed, a process S602 of determining whether to apply the GIIP mode may be first performed. Whether to apply the GIIP mode may be determined based on a syntax element, prediction types of neighbor blocks, an angle of a partition edge, etc.

As one example, the encoding apparatus may determine whether the GIIP mode has been applied to the current block and set a value of an application syntax element as a value corresponding to the determination result. The encoding apparatus may encode the application syntax element and may signal the application syntax element to the decoding apparatus. The entropy decoder 410 may decode the application syntax element from the bitstream, and may determine whether to apply the GIIP mode based on the value of the application syntax element (S602).

The application syntax element may be a 1-bit flag. When the application syntax element==0, the GIIP mode is not applied. In this case, as in a conventional TPM, inter prediction using a merge index of each of non-rectangular blocks may be performed. When the application syntax element==1, the GIIP mode may be applied, inter prediction using motion information may be performed on an inter block (a block predicted based on an inter prediction type among the non-rectangular blocks), and intra prediction using an intra prediction mode may be performed on an intra block (a block predicted based on an intra prediction type among the non-rectangular blocks).

As another example, the encoding apparatus and the decoding apparatus may determine whether to apply the GIIP mode based on the number of blocks predicted based on an intra prediction type among neighbor blocks positioned to neighbor a current block.

Figure 8:
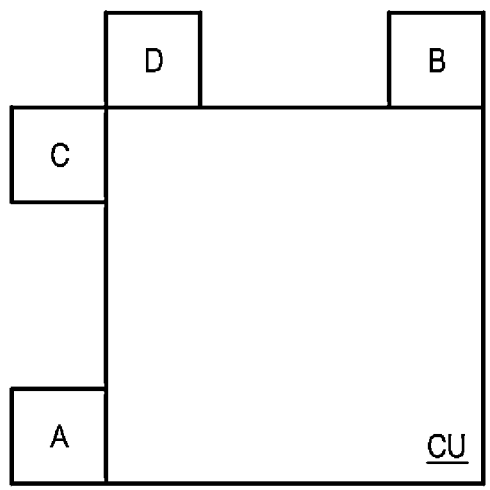
FIG. 8 is a diagram of neighbor blocks used to determine whether to apply a first mode.

In the example of FIG. 8, whether to apply the GIIP mode may be determined by considering prediction types of neighboring blocks A, B, C, and D or by considering prediction types of neighboring blocks A and B.

If the prediction types of A, B, C, and D are considered, when the number of intra-predicted neighbor blocks is 3 or more, it may be determined that the GIIP mode is applied. When the number of intra-predicted neighbor blocks is 2, whether to apply the GIIP mode may be determined based on a value of the application syntax element. When the number of intra-predicted neighbor blocks is 1 or less, it may be determined that the GIIP mode is not applied. According to an embodiment, when the number of intra-predicted neighbor blocks is 2 or more or 3, it may be determined that the GIIP mode is applied. According to an embodiment, when the number of neighbor blocks is less than 2 or 3, it may be determined that the GIIP mode is not applied.

If prediction types of neighboring blocks A and B are considered, when the number of intra-predicted neighbor blocks is 2, it may be determined that the GIIP mode is applied. When the number of intra-predicted neighbor blocks is 1, whether to apply the GIIP mode may be determined based on a value of the application syntax element. When the number of intra-predicted neighbor blocks is 0, it may be determined that the GIIP mode is not applied. According to an embodiment, when the number of intra-predicted neighbor blocks is 1 or more or 2, it may be determined that the GIIP mode is applied. According to an embodiment, when the number of intra-predicted neighbor blocks is less than 1 or 2, it may be determined that the GIIP mode is not applied.

3. Determine an Inter Block and an Intra Block

Referring back to the process S604, when the current block is partitioned into the non-rectangular locks, a process S606 is performed for determining an intra block to be intra-predicted and an inter block to be inter-predicted among the non-rectangular blocks. The process S606 may be a process of determining prediction types of the non-rectangular blocks.

The prediction types of the non-rectangular blocks may be 1) explicitly determined by a type syntax element indicating prediction types of the non-rectangular blocks or 2) may be implicitly determined by one or more of an angle of a partition edge and a perpendicular distance from a center of the current block to the partition edge (S608).

In the case of 1), the encoding apparatus may set the prediction types of the non-rectangular blocks as a value of the type syntax element, encode the type syntax element, and signal the type syntax element to the decoding apparatus. The decoding apparatus may decode the type syntax element from the bitstream. The predictor 440 may determine the prediction types of the non-rectangular blocks based on the value of the type syntax element.

In the case of 2), the predictor 120, 440 may determine the prediction types of the non-rectangular blocks based on one or more of an angle of the partition edge (an angle formed by the partition edge and a horizontal direction of a current block) and a perpendicular distance (a perpendicular distance between the partition edge and the center).

Figure 9:
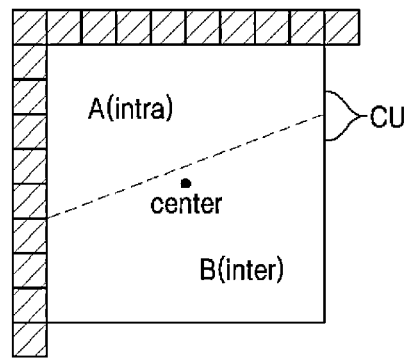
FIG. 9 is a diagram for describing an example of a method of determining an inter block and an intra block.
Figure 9:
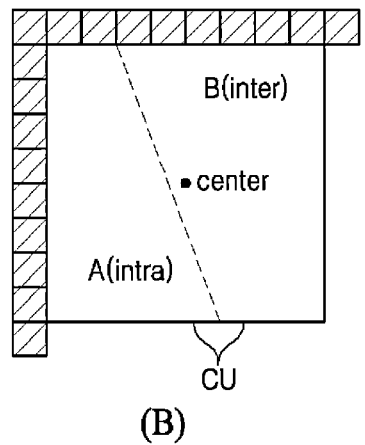
Figure 9:
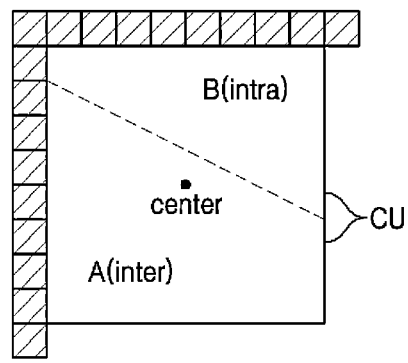

As in FIG. 9(A), when an angle of the partition edge is 0 to 90 degrees, a non-rectangular block (top block) positioned at the top is positioned closer to reference samples (samples marked with a pattern) used for intra prediction than a non-rectangular block (bottom block) positioned at the bottom. Accordingly the top block may be determined as an intra block, and the bottom block may be determined as an inter block.

Alternatively or additionally, in the case of FIG. 9(A), as the perpendicular distance of a partition edge to the center of the current block is increased, the number of reference samples neighboring the top block is reduced, and the number of reference samples neighboring the bottom block is increased. If the perpendicular distance becomes very large and the number of reference samples neighboring the top block is less than the number of reference samples neighboring the bottom block, the top block may be determined as an inter block, and the bottom block may be determined as an intra block.

As in FIG. 9(B), if an angle of a partition edge is 90 to 180 degrees, a non-rectangular block (block A) positioned on the left is positioned closer to the reference samples than a non-rectangular block (block B) positioned on the right. Accordingly, in this case, the block A may be determined as an intra block, and the block B may be determined as an inter block.

Alternatively or additionally, in the case of FIG. 9(B), as the perpendicular distance of the partition edge to the center is increased, the number of reference samples neighboring the left block (block A) is reduced, and the number of reference samples neighboring the right block (block B) is increased. If the perpendicular distance becomes very large and the number of reference samples neighboring the block A is less than the number of reference samples neighboring the block B, the block A may be determined as an inter block, and the block B may be determined as an intra block.

As in FIG. 9(C), if an angle of a partition edge is 90 to 180 degrees and the partition edge is positioned over the center of the current block, a non-rectangular block (block B) positioned at the top is positioned closer to reference samples compared to a non-rectangular block (block A) positioned at the bottom. Accordingly, in this case, the block B may be determined as an intra block, and the block A may be determined as an inter block.

Alternatively or additionally, in the case of FIG. 9(C), as the perpendicular distance of the partition edge to the center is increased, the number of reference samples neighboring the block B is reduced, and the number of reference samples neighboring the block A is increased. If the perpendicular distance becomes very large and the number of reference samples neighboring the block B is less than the number of reference samples neighboring the block A, the block B may be determined as an inter block, and the block A may be determined as an intra block.

4. Derive Prediction Samples of Non-Rectangular Blocks (Execution of Prediction)

When an inter block and an intra block are determined, a process S610 is performed for deriving or generating prediction samples for each of the inter block and the intra block.

The process of deriving the prediction samples of the inter block may be performed based on motion information. The encoding apparatus may encode motion information (e.g., a merge index) used in the inter prediction of the inter block and signal the motion information to the decoding apparatus. The decoding apparatus may decode the motion information from a bitstream. The inter predictor 444 may derive the prediction samples of a first area by using the motion information.

The first area is an area including the inter block and may be included in the current block. Accordingly, the first area may be the same as the inter block or an area including more samples positioned around the partition edge or the same as the current block. If the first area is the same as the current block, inter prediction samples for the entire current block may be derived.

Determine an Intra Prediction Mode

The process of deriving the prediction samples of the intra block may be performed based on an intra prediction mode. The encoding apparatus may encode information on a prediction mode (intra prediction mode) used in the intra prediction of the intra block, and may signal the information to the decoding apparatus. The information on the intra prediction mode may be an index (mode index) indicating any one of the preset intra prediction mode candidates. The decoding apparatus may decode information on an intra prediction mode from a bitstream. The intra predictor 442 may derive prediction samples of a second area by using the intra prediction mode indicated by the decoded information.

The second area is an area including the intra block and may be included in a current block. Accordingly, the second area may be the same as the intra block or an area including more samples positioned around the partition edge or the same as the current block. If the second area is the same as the current block, intra prediction samples for the entire current block may be derived.

According to an embodiment, intra prediction mode candidates may include one or more directional modes identical with or similar to (corresponding to an angle of the partition edge) an angle of the partition edge. According to another embodiment, the intra prediction mode candidates may further include a horizontal (HOR) mode and a vertical (VER) mode in addition to directional modes corresponding to a partition edge and may further include a planar mode that is a non-directional mode.

Figure 10:
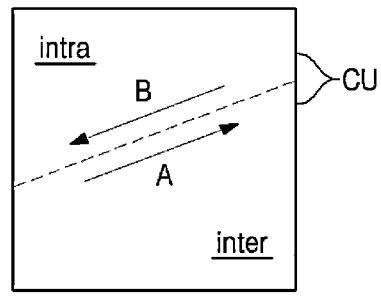
FIG. 10 is a diagram for describing an example of a method of determining an intra prediction mode.
Figure 10:
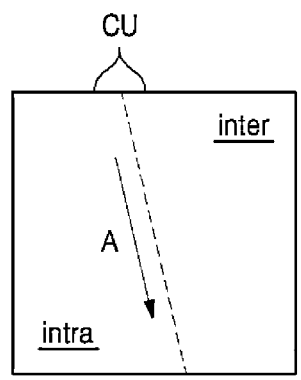
Figure 10:
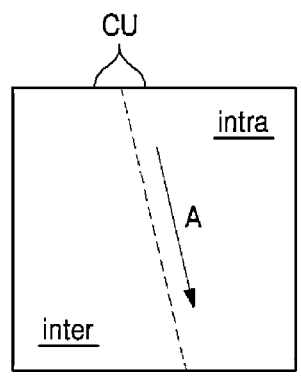
Figure 11:
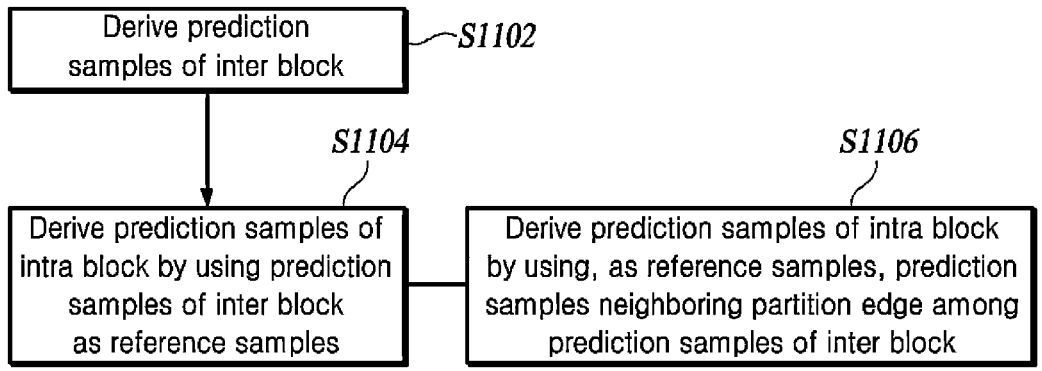
FIG. 11 is a flowchart for describing an example of a method of using prediction samples of an inter block as a reference sample for the prediction of an intra block.

As in FIG. 10(A), if directional modes corresponding to an angle of the partition edge are modes A and B, intra prediction mode candidates may include the directional mode A and the directional mode B. The intra prediction mode candidates may further include one or more of the planar mode, the HOR mode, or the VER mode in addition to the directional modes A and B.

As in FIG. 10(B), if a directional mode corresponding to an angle of the partition edge is mode A, intra prediction mode candidates may include the directional mode A. The intra prediction mode candidates may further include one or more of the planar mode or the HOR mode in addition to the directional mode A.

As in FIG. 10(C), if a directional mode corresponding to an angle of the partition edge is mode A, intra prediction mode candidates may include the directional mode A. The intra prediction mode candidates may further include one or more of the planar mode or the VER mode in addition to the directional mode A.

According to an embodiment, intra prediction mode candidates may include 93 directional modes (except the planar mode and the DC mode among wide-angle intra prediction modes) as shown in FIG. 3B regardless of an angle of the partition edge or may include 67 intra prediction modes as shown in FIG. 3A. According to another embodiment, intra prediction mode candidates may include 35 intra prediction modes including the HOR directional mode, the VER directional mode, and the planar mode.

In another some embodiments, the intra prediction mode used in the prediction of the intra block is not explicitly indicated by information on the intra prediction mode but may be previously agreed upon between the encoding apparatus and the decoding apparatus. For example, the intra prediction mode used in the prediction of the intra block may be previously agreed upon as any one of the intra prediction mode candidates, e.g., as the planar mode.

Derive Prediction Samples of an Intra Block

Prediction samples of an intra block may be derived with reference to only samples positioned around a current block (first type) or may be derived with reference to both samples positioned around a current block and prediction samples of an inter block (second type).

Whether to perform the second type may be explicitly indicated through a 1-bit flag or it may be previously agreed upon that the second type is always performed when the GIIP mode is applied (implicit). If whether to perform the second type is explicitly indicated, the encoding apparatus may determine whether to perform the second type and may set a result thereof as a value of the 1-bit flag. The encoding apparatus may encode the 1-bit flag and may signal the 1-bit flag to the decoding apparatus. The entropy decoder 410 may decode the 1-bit flag from a bitstream.

Figure 12:
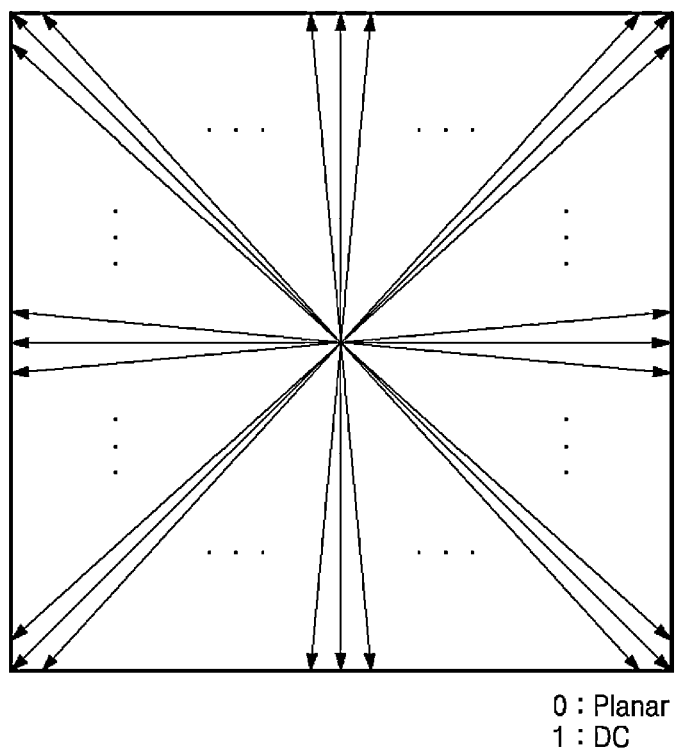
FIGS. 12 and 13 are diagrams for describing an example of the method of FIG. 11.

If the second type is performed, the inter predictor 124, 444 may derive prediction samples of an inter block by performing a motion compensation process based on motion information (S1102). The intra predictor 122, 442 may derive prediction samples of an intra block with reference to both samples positioned around a current block and prediction samples of an inter block (S1104). Intra prediction mode candidates for the second type may include directional modes covering 360 degrees as exemplified in FIG. 12, the planar mode and the DC mode.

A process of applying a smoothing filter to the prediction samples of the inter block may be performed between the process S1102 and the process S1104. In other words, the intra predictor 122, 442 may derive the prediction samples of the intra block with reference to prediction samples of an inter block to which the smoothing filter has been applied. Whether to apply the smoothing filter may be explicitly indicated through a 1-bit flag signaled by the encoding apparatus or may be previously agreed between the encoding apparatus and the decoding apparatus.

The intra predictor 122, 442 may derive the prediction samples of the intra block with reference to some or all of the prediction samples of the inter block. For example, the intra predictor 122, 442 may derive the prediction samples of the intra block with reference to prediction samples neighboring the partition edge among the prediction samples of the inter block (S1106).

Figure 13:
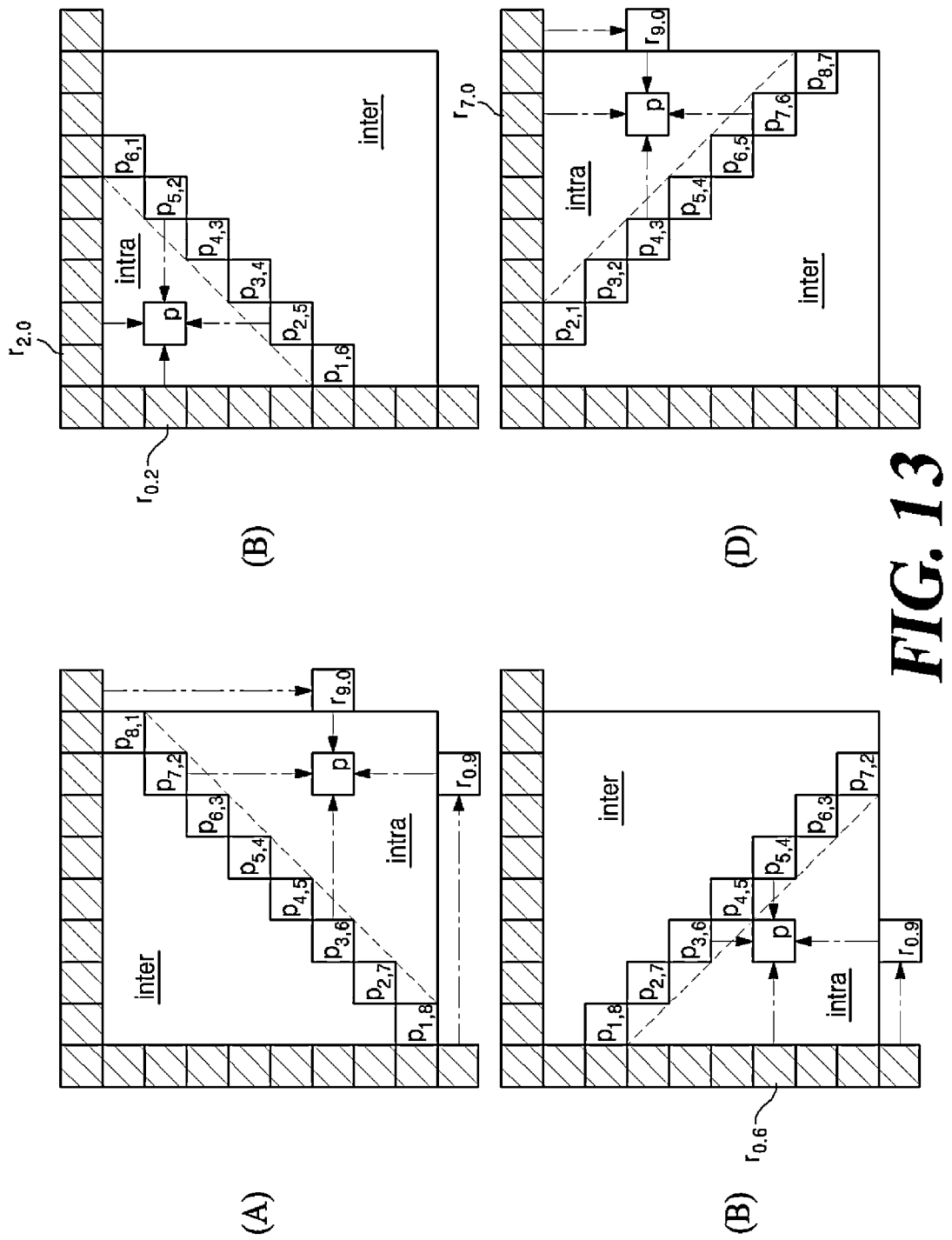
Figure 14:
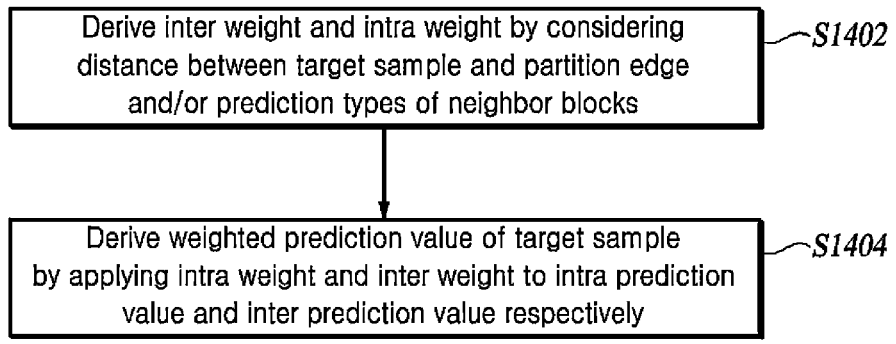
FIG. 14 is a flowchart for describing an example of a method of removing discontinuity in a partition edge.

FIG. 13 illustrates an example in which the prediction samples of the intra block are derived based on the planar mode with reference to the prediction samples of the inter block neighboring the partition edge.

In the example of FIG. 13(A), a prediction sample of the sample (p) within the intra block may be derived with reference to $r_{0,9}$ and $r_{9,0}$ among neighbor samples (samples marked with a pattern) and $p_{3,6}$ and $p_{7,2}$ among prediction samples ($p_{1,8}$, $p_{2,7}$, $p_{3,6}$, $p_{4,5}$, $p_{5,4}$, $p_{6,3}$, $p_{7,2}$ and $p_{8,1}$) of an inter block.

In the example of FIG. 13(B), a prediction sample of the sample (p) within the intra block may be derived with reference to $r_{0,2}$ and $r_{2,0}$ among neighbor samples (samples marked with a pattern) and $p_{2,5}$ and $p_{5,2}$ among prediction samples ($p_{1,6}$, $p_{2,5}$, $p_{3,4}$, $p_{4,3}$, $p_{5,2}$, and $p_{6,1}$) of an inter block.

In the example of FIG. 13(C), a prediction sample of the sample (p) within the intra block may be derived with reference to $r_{0,6}$ and $r_{0,9}$ among neighbor samples (samples marked with a pattern) and $p_{3,4}$ and $p_{5,6}$ among prediction samples ($p_{1,2}$, $p_{2,3}$, $p_{3,4}$, $p_{4,5}$, $p_{5,6}$, $p_{6,7}$ and $p_{7,8}$) of an inter block.

In the example of FIG. 13(D), a prediction sample of the sample (p) within the intra block may be derived with reference to $r_{7,0}$ and $r_{9,0}$ among neighbor samples (samples marked with a pattern) and $p_{4,3}$ and $p_{7,6}$ among prediction samples ($p_{2,1}$, $p_{3,2}$, $p_{4,3}$, $p_{5,4}$, $p_{6,5}$, $p_{7,6}$ and $p_{8,7}$) of an inter block.

5. Prediction Sample Blending

When the derivation of the prediction samples is completed, a blending process may be performed for removing or reducing discontinuity occurred in the partition edge. The blending process may be a process of performing a weighted sum of an inter prediction value and an intra prediction value for a to-be-predicted target sample within a current block, based on a distance between the target sample and the partition edge.

Whether to perform the blending process may be explicitly indicated through a 1-bit flag signaled from the encoding apparatus to the decoding apparatus or may be previously agreed upon between the encoding apparatus and the decoding apparatus. Whether to perform the blending process may be determined based on an intra prediction mode of an intra block, a sample value difference between neighbor samples of the partition edge, etc. For example, when the sample value difference is greater than or smaller than a preset specific value, the blending process may be performed.

Derive Weight

If it is determined that the blending process is applied, the predictor 120, 440 may derive an inter weight and an intra weight (S1402). The inter weight and the intra weight may be derived by considering a distance between the target sample in the current block and the partition edge, prediction types of neighbor blocks, an intra prediction mode, etc. The inter weight corresponds to a weight to be applied to an inter prediction value for the target sample. The intra weight corresponds to a weight to be applied to an intra prediction value for the target sample.

The inter weight and the intra weight may be derived by considering the distance between the target sample and the partition edge. For example, Equation 2 may be used.

$$\text{sampleWeight}_{intra}[x][y] = \text{BlendFilter}[\text{dist}]$$

$$\text{sampleWeight}_{inter}[x][y] = Y - \text{BlendFilter}[\text{dist}] \quad \text{[Equation 2]}$$

In Equation 2, (x, y) indicates a position of the target sample, sampleWeight$_{intra}$ indicates an intra weight, and sampleWeight$_{inter}$ indicates an inter weight. Y is determined by a blending filter, and Y is set equal to $2^n$ if an n-bit blending filter is used. Accordingly, Y=8 if a 3-bit blending filter is used. The variable dist is a value obtained by scaling a perpendicular distance between the target sample and the partition edge and may be obtained through a lookup table based on a distance between a position of the target sample and the partition edge and an angle of the partition edge. When a dist value is 0 to 14, a value of 3-bits BlendFilter[dist] may be derived through Table 1 below.

TABLE 1

|  | dist | | | | | | | | | | | | | | |
| --- | --- | --- | --- | --- | --- | --- | --- | --- | --- | --- | --- | --- | --- | --- |
|  | 0 | 1 | 2 | 3 | 4 | 5 | 6 | 7 | 8 | 9 | 10 | 11 | 12 | 13 | 14 |
| BlendFilter[dist] | 4 | 4 | 5 | 5 | 5 | 5 | 6 | 6 | 6 | 6 | 7 | 7 | 7 | 7 | 8 |

The inter weight and the intra weight may be derived by further considering prediction types of neighbor blocks, e.g., through Equation 2, Equation 3, and Equation 4.

$$\text{sampleWeight}_{intra}[x][y] = \text{BlendFilter}[\text{dist}] - a$$

$$\text{sampleWeight}_{inter}[x][y] = Y - \text{BlendFilter}[\text{dist}] + a \quad \text{[Equation 3]}$$

sampleWeight$_{intra}$[x][y]=BlendFilter[dist]+a sampleWeight$_{inter}$[x][y]=Y−BlendFilter[dist]−a  [Equation 4]

Equation 3 may be applied when the number of neighbor blocks (intra neighbor blocks) predicted by an intra prediction type is smaller than the number of neighbor blocks (inter neighbor blocks) predicted by an inter prediction type. In other words, when the number of inter neighbor blocks is greater than the number of intra neighbor blocks, the inter weight may be derived by adding an offset (a) to a value 'Y-BlendFilter[dist]', and the intra weight may be derived by subtracting the offset (a) from a value BlendFilter[dist]. In this case, the offset (a) may be preset based on a difference between the number of intra neighbor blocks and the number of inter neighbor blocks.

Equation 4 may be applied when the number of intra neighbor blocks is greater than the number of inter neighbor blocks. In other words, when the number of intra neighbor blocks is greater than the number of inter neighbor blocks, the intra weight may be derived by adding the offset (a) to a value BlendFilter[dist], and the inter weight may be derived by subtracting the offset (a) from a value 'Y−BlendFilter[dist]'.

Figure 15:
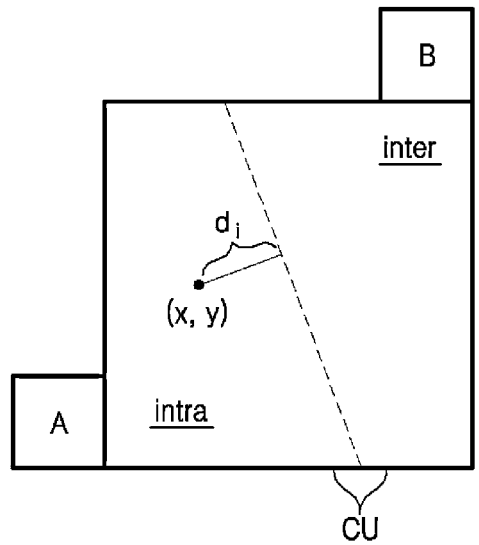
FIG. 15 is a diagram for describing an example of a method of deriving a weight used in the method of FIG. 14.

FIG. 15 illustrates an example in which the inter weight and the intra weight are derived by further considering prediction type of two neighbor blocks.

In FIG. 15, A and B indicate two neighbor blocks, (x, y) indicates a position of the target sample, and $d_t$ indicates a distance between the target sample and the partition edge (a straight line represented as a dotted line).

If any one of A or B is predicted based on an intra prediction type and the other is predicted based on an inter prediction type, the inter weight and the intra weight may be derived through Equation 2. If both A and B are predicted based on an inter prediction type, the inter weight and the intra weight may be derived through Equation 3. If both A and B are predicted based on an intra prediction type, the inter weight and the intra weight may be derived through Equation 4.

Derive Weighted Prediction Value

When the inter weight and the intra weight are derived, the predictor 120, 440 may derive a weighted prediction value for the target sample through the blending process in which the intra weight and the inter weight are respectively applied to an intra prediction value and an inter prediction value for the target sample.

A process of deriving the weighted prediction value may be performed through Equation 5.

$P_{blended}$=(sampleWeight$_{intra}$*$P_{intra}$+ sampleWeight$_{inter}$*$P_{inter}$+$2^{n-1}$)>>n  [Equation 5]

In Equation 5, $P_{blended}$ indicates the weighted prediction value. $P_{intra}$ indicates an intra prediction value for the target sample. $P_{inter}$ indicates an inter prediction value for the target sample.

6. Partition Edge Deblocking Filtering

If the GIIP mode has been performed, the deblocking filter may be applied to a block edge.

Whether to perform deblocking filtering may be explicitly indicated through a 1-bit flag signaled from the encoding apparatus to the decoding apparatus or it may be previously agreed upon between the encoding apparatus and the decoding apparatus that deblocking filtering is always performed. The deblocking filtering may be performed when a difference between values of samples neighboring a block edge is greater than or smaller than a preset specific value (threshold value) or may be performed when a quantization parameter value for values of samples neighboring a block edge is greater than or smaller than a preset parameter value. Moreover, whether to perform deblocking filtering may be determined based on an intra prediction mode. A deblocking filter used in deblocking filtering may be determined based on an intra prediction mode.

When prediction samples (prediction blocks) and residual samples (residual blocks) are summed to reconstruct an image, filtering is performed on the reconstructed image. The filtered image may be used for the prediction of another image or stored in the memory 190, 470 for a display.

Figure 16:
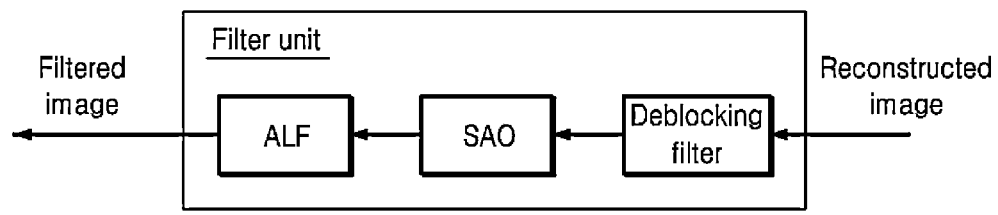
FIG. 16 is a block diagram of a filter unit.

As illustrated in FIG. 16, a conventional filter unit may be configured to include a deblocking filter, an SAO, and an adaptive loop filter (ALF). The reconstructed image may be sequentially filtered in an order of the deblocking filter, the SAO, and the ALF so as to output a filtered image.

The SAO classifies samples within the reconstructed image according to a predefined criterion, and adaptively applies an offset based on the corresponding classification. In other words, the SAO adaptively applies the offset to the samples. For the application of the SAO, mode information (information indicating any one type (mode) among an edge offset, a band offset and SAO non-execution) and offset information are signaled from the encoding apparatus to the decoding apparatus at a CTU level.

The ALF applies adaptive filtering to a sample feature in a per block basis in order to minimize an error between an original image and the reconstructed image. For the application of the ALF, information related to filter sets is signaled from the encoding apparatus to the decoding apparatus at an adaption parameter set (APS) level, and a filter set is selected at a CTU level. A mode (indicating any one class to which a corresponding block belongs among a total of N classes (modes) according to the direction and activity of samples within a block) may be derived in a block unit within a CTU. A filter corresponding to the derived mode is applied to the reconstructed image of that block.

As described above, the SAO and the ALF apply an adaptive offset and filter to samples in a sample unit. Furthermore, the SAO and the ALF perform a "process of deriving a sample feature" and a "process of applying an offset and a filter suitable for the feature."

When the SAO and the ALF are applied, the "process of deriving a sample feature" is redundantly performed or separately performed for each of the SAO and the ALF. The present disclosure proposes a method of integrating the separately performed processes into one process to efficiently perform a filtering process for a reconstructed image.

Figure 17:
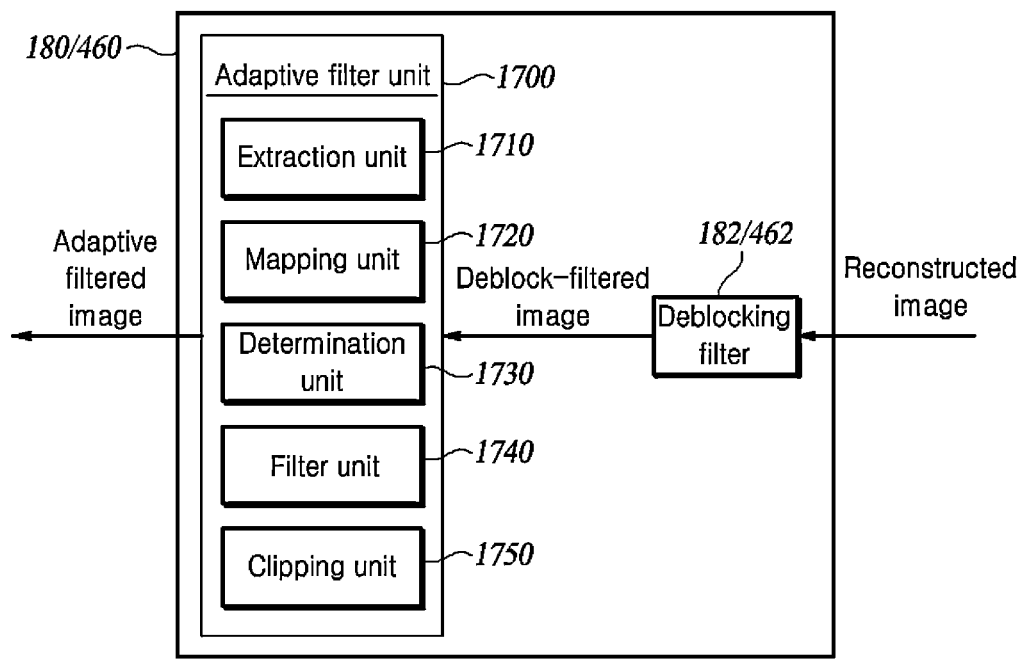
FIG. 17 is a block diagram of a filter unit proposed in the present disclosure.
Figure 18:
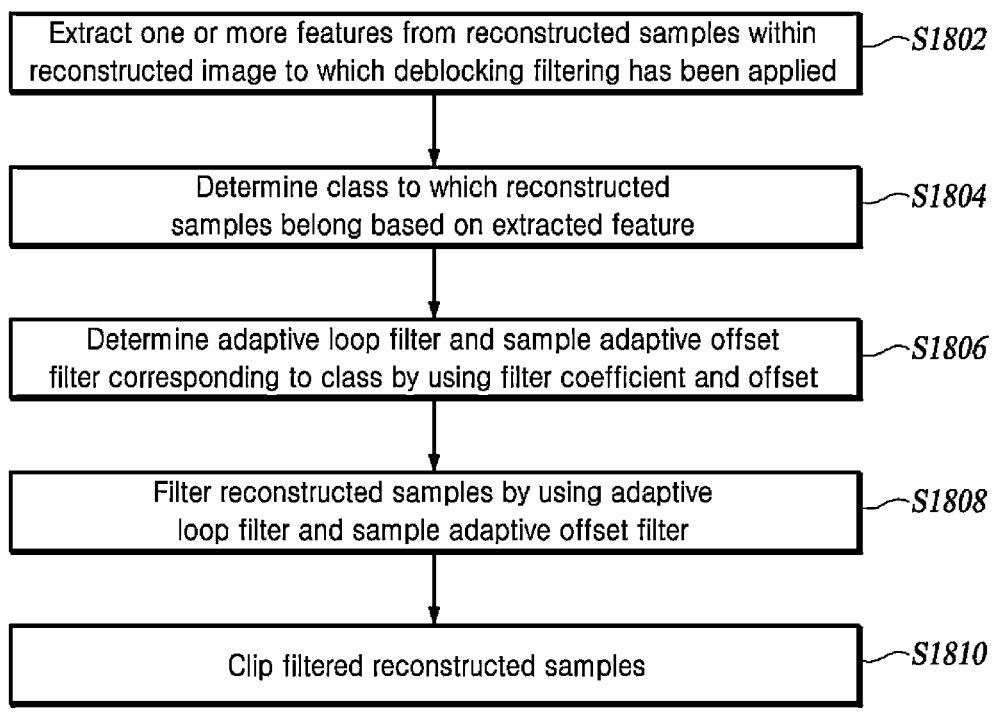
FIG. 18 is a flowchart for describing an example of an adaptive filtering method.

FIG. 17 is a block diagram of the filter unit 180, 460 proposed in the present disclosure. FIG. 18 is a flowchart for describing an example of an adaptive filtering method.

As illustrated in FIG. 17, the filter unit 180, 460 may be configured to include a deblocking filter 182, 462 and an adaptive filter unit 1700. The adaptive filter unit 1700 may be configured to include an extraction unit 1710, a mapping unit 1720, a determination unit 1730, a filter unit 1740, and a clipping unit 1750.

A. Extraction of Feature

The extraction unit 1710 may extract one or more features from one or more reconstructed samples within a reconstructed image to which the deblocking filtering has been applied (S1802).

The features may be extracted for each unit in which filtering is performed among the reconstructed samples within the reconstructed image. In this case, the unit in which the filtering is performed may be any one of a sample, a block, a CTU, etc. The feature may be a representative value of reconstructed samples, such as an average value, the most probable value, a center value, the minimum value, a maximum value, etc. of reconstructed samples. Furthermore, the feature may be a value calculated using representative values of reconstructed samples.

The feature may be extracted through a one-dimensional filter or two-dimensional filter of three taps. The one-dimensional filter may be applied in several directions, such as a vertical direction, a horizontal direction, and a diagonal direction. For each direction, a value resulting from the application of the one-dimensional filter may be extracted as the feature of that direction. For example, an absolute value of a filtered value may be extracted as a feature. The two-dimensional filter may be a 1st-order differential filter or 2nd-order differential filter. The two-dimensional filter may be a 1st-order differential filter or a 2nd-order differential filter defined for several directions, such as a horizontal direction ((B) of FIG. 19A, (B) of FIG. 19B), a vertical direction ((A) of FIG. 19A, (A) of FIG. 19B), and a diagonal direction ((C) and (D) of FIG. 19A, (C) and (D) of FIG. 19B).

The feature may be extracted using information necessary for the extraction of the feature. The information for the extraction of the feature may be filter-related information. The filter-related information may include a shape, size, coefficient, etc. of the filter, may include mode information of the filter, or may include coefficients of a residual filter. In this case, the extraction unit 1710 of the decoding apparatus may determine a filter by using information necessary for the extraction of the feature and may extract the feature from reconstructed samples by using the determined filter.

The information necessary for the extraction of the feature may be mode information indicating any one of several modes available for reconstructed samples according to a direction. In this case, the extraction unit 1710 of the decoding apparatus may determine a mode (direction) of the reconstructed samples by using the information necessary for the extraction of the feature and may extract a feature (current reconstructed sample and neighbor reconstructed samples) from the reconstructed samples by using the determined mode.

Figure 20A:
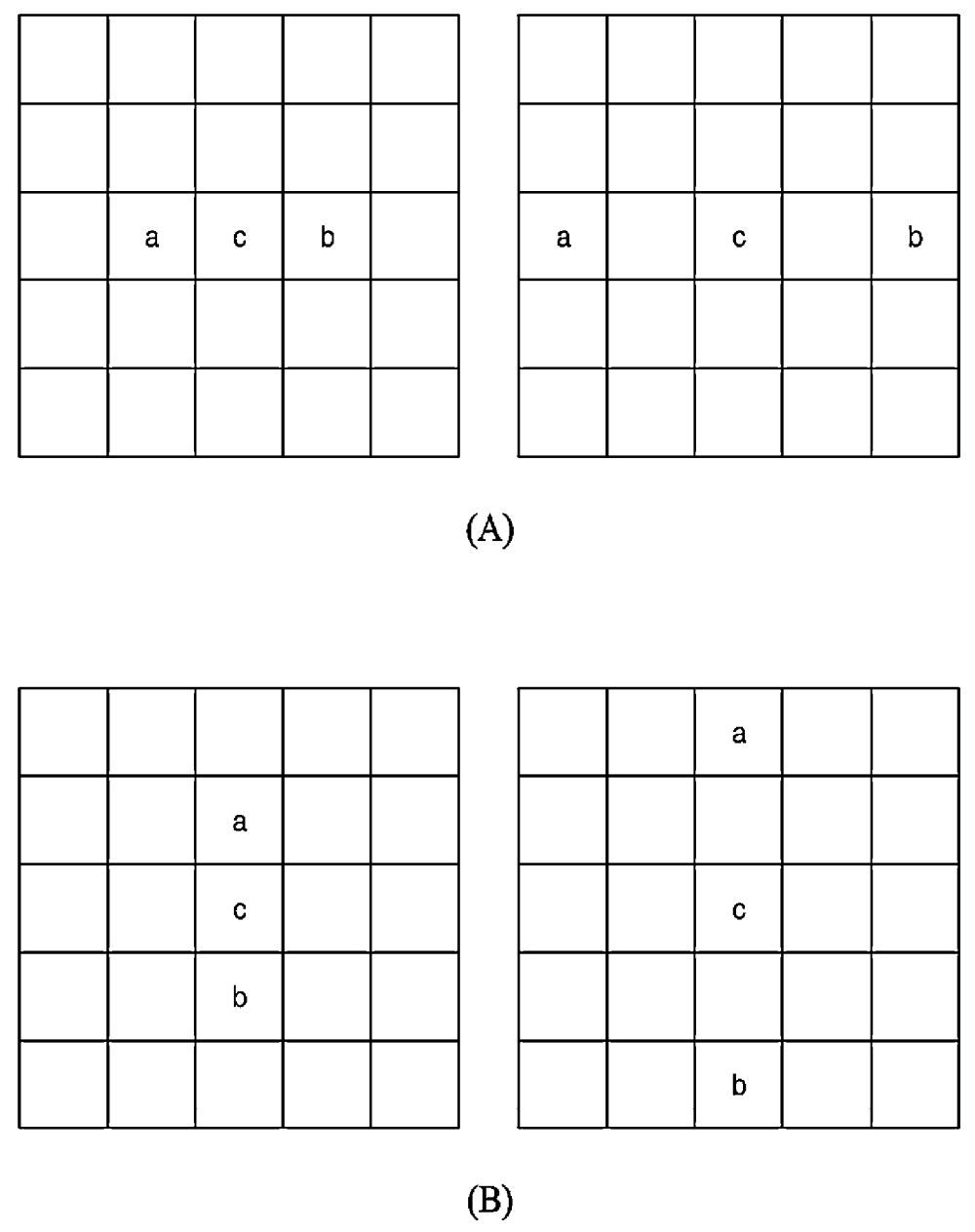
Figure 20B:
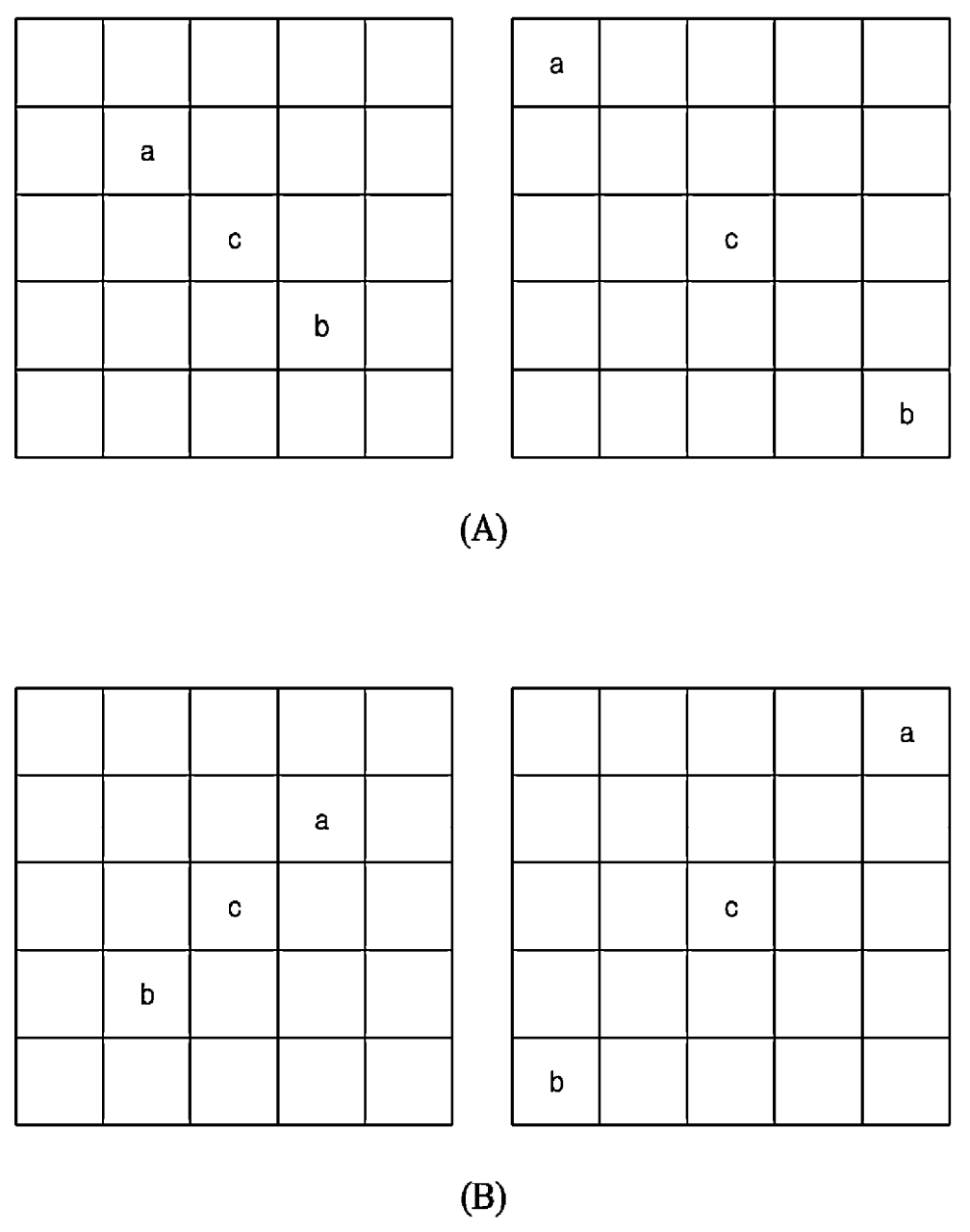

FIGS. 20A and 20B illustrates examples of the current reconstructed sample and neighbor reconstructed samples which may be extracted as features. A feature may be some of a current reconstructed sample (c) and neighbor reconstructed samples (a, b) that are horizontally arranged as in (A) of FIG. 20A or may be some of a current reconstructed sample (c) and neighbor reconstructed samples (a, b) that are vertically arranged as in (B) of FIG. 20A. A feature may be some of a current reconstructed sample (c) and neighbor reconstructed samples (a, b) that are arranged in a diagonal direction of 135 degrees as in (A) of FIG. 20B or may be some of a current reconstructed sample (c) and neighbor reconstructed samples (a, b) that are arranged in a diagonal direction of 45 degrees as in (B) of FIG. 20B.

The information necessary for the extraction of the feature may be encoded by the encoding apparatus and may be signaled to the decoding apparatus through one or more of an SPS level, a PPS level, a slice header (SH) level, a picture header (PH) level, and a CTU level.

The extracted feature may be input to the mapping unit 1720. According to an embodiment, a quantization value that quantizes the extracted feature may be input to the mapping unit 1720 or a mapping value of the extracted feature mapped using a lookup table may be input to the mapping unit 1720. Information on the lookup table may be signaled from the encoding apparatus to the decoding apparatus or it may be previously agreed between the encoding apparatus and the decoding apparatus so that the same lookup table is used.

B. Class Mapping

The mapping unit 1720 may determine a class to which reconstructed samples belong based on an extracted feature value (S1804). The process may be a process of mapping the extracted feature to a class to which the reconstructed samples belong among preset classes.

For example, the class mapping may be performed by using an equation. The equation for class mapping may be signaled from the encoding apparatus to the decoding apparatus or parameters of the equation may be signaled from the encoding apparatus to the decoding apparatus.

As an example, Equation 6 may be used as the equation for class mapping.

$$C = A \times M \times B \qquad [\text{Equation 6}]$$

In Equation 6, C indicates a mapped class, and A and B indicate two features input to the mapping unit 1720. Any one of A or B may be a magnitude of variation centered on a current reconstructed sample or may be a direction of the variation. M may be determined based on A, B, and N (the number of preset classes). For example, if N=25, C=0 to 24, A=0 to 4, and B=0 to 4, M=5 may be determined.

As another example, the class mapping may be performed using a lookup table. The encoding apparatus may encode a lookup table for class mapping and signal the lookup table to the decoding apparatus, or the encoding apparatus and the decoding apparatus may be previously configured to use the same lookup table.

As yet another example, if a current reconstructed sample and neighbor reconstructed samples are extracted as features and input to the mapping unit 1720, a class may be mapped based on the sample value of the current reconstructed sample and the sample values of the neighbor reconstructed samples.

Figure 21:
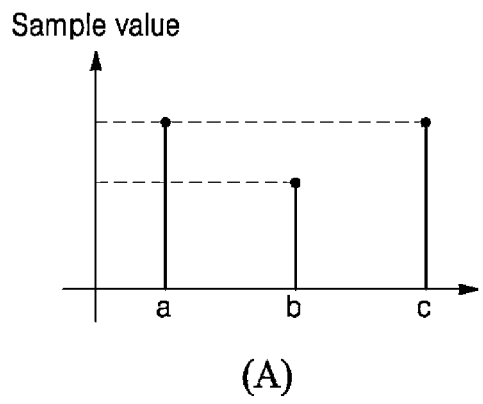
FIG. 21 is a diagram of reconstructed samples for describing a method of determining classes of the reconstructed samples.
Figure 21:
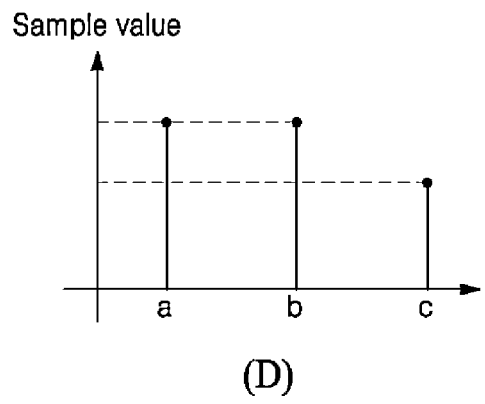
Figure 21:
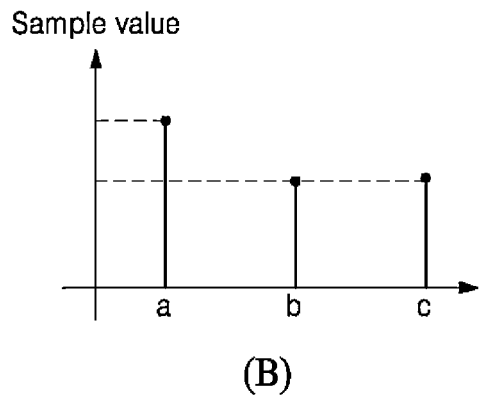
Figure 21:
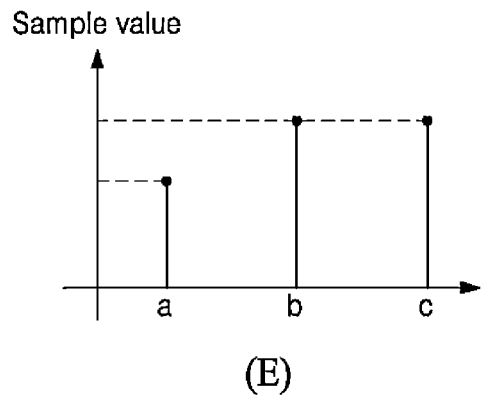
Figure 21:
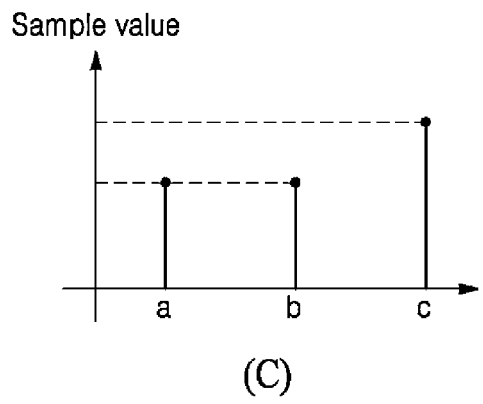
Figure 21:
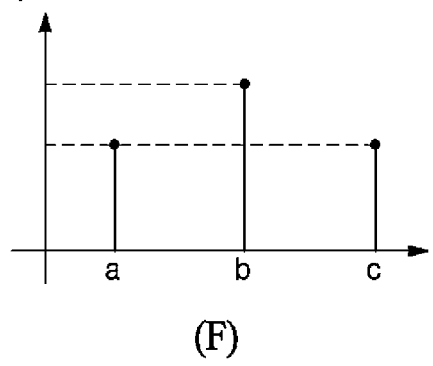

Referring to FIG. 21, when values of neighbor reconstructed samples (a, c) are greater than a value of a current reconstructed sample (b) and the values of the neighbor reconstructed samples (a, c) are the same as in FIG. 21(A), a first class may be mapped. When a value of any one of the neighbor reconstructed samples (a, c) is the same as a value of a current reconstructed sample (b) and a value of the other thereof is greater than the value of the current reconstructed sample (b) as in FIGS. 21(B) and 21(C), a second class may be mapped. When a value of any one of the neighbor reconstructed samples (a, c) is the same as a value of a current reconstructed sample (b) and a value of the other thereof is smaller than the value of the current reconstructed sample (b) as in FIGS. 21(D) and 21(E), a third class may be mapped.

When a value of a current reconstructed sample (b) is greater than values of neighbor reconstructed samples (a, c) and the values of the neighbor reconstructed samples (a, c) are the same as in FIG. 21(F), a fourth class may be mapped. Furthermore, a case that does not correspond to FIGS. 21(A) to (F) may be determined as a fifth class. A mapped class may be input to the determination unit 1730.

C. Determine Filter

The determination unit 1730 may determine an SAO filter and an ALF filter, which correspond to the mapped class (S1806).

The encoding apparatus may generate or determine, based on the mapped class, optimal filter coefficients (optimal ALF filter) and an offset (optimal SAO filter) for each unit in which filtering is performed. For example, the optimal ALF filter and the optimal SAO filter may be determined using a following method: determining the optimal ALF filter by applying the least square method to values of original samples and values of reconstructed samples, and then determining the offset using an average of errors between the values of the reconstructed samples and the values of the original samples to which the optimal ALF has been applied.

Information on the optimal ALF filter (filter coefficient information) and information on the optimal SAO filter (offset information) may be encoded and signaled from the encoding apparatus to the decoding apparatus. The filter coefficient information and the offset information may be signaled at an APS level or a level (e.g., a slice header level) higher than the APS level.

The decoding apparatus may determine an SAO filter and ALF filter corresponding to a class, by using the signaled filter coefficient information and offset information. For example, the decoding apparatus may determine or update filter coefficients and an offset to be used in a unit to be currently filtered by using "filter coefficient information and offset information signaled at the higher level," "filter coefficient information and offset information signaled at the APS level," or "filter coefficients and an offset used in a previous filtering unit." The determined filter coefficients may be some of all coefficients of a filter. Furthermore, some filter coefficients may be shared in a unit to be next filtered. The shared some filter coefficients may be determined by a class or by mode information signaled from the encoding apparatus.

Information on the determined SAO filter and ALF filter may be input to the filter unit 1740.

D. Filtering

The filter unit 1740 may filter the reconstructed samples by using the SAO filter and ALF filter determined by the determination unit 1730 (S1808).

A process S1808 of filtering, by the filter unit 1740, the reconstructed samples may be divided into a process (SAO filtering) of applying the SAO filter to the reconstructed samples and a process (ALF filtering) of applying the ALF filter to the reconstructed samples. The SAO filtering and the ALF filtering may be simultaneously performed. Alternatively, the ALF filtering may be performed after the SAO filtering is first performed.

If the SAO filtering and the ALF filtering are simultaneously performed, the process of filtering the reconstructed samples may be represented as Equation 7.

$$=W \cdot X + O \qquad \text{[Equation 7]}$$

In Equation 7, W indicates a coefficient vector of the ALF filter, O indicates an SAO filter coefficient (offset), X indicates a the reconstructed sample vector corresponding to a filter coefficient position, and x indicates a reconstructed sample resulting from the SAO filtering and the ALF filtering. W and X are vectors having the same length. As in Equation 7, x may be derived by performing the dot product calculation on W and X and then applying O.

If the SAO filtering is first performed and the ALF filtering is then performed, the process of filtering the reconstructed samples may be represented as Equation 8.

$$x = W \cdot (X + O) \qquad \text{[Equation 8]}$$

As in Equation 8, after O is first applied to X, dot product calculation between (X+O) and W may be performed, so that x may be derived.

E. Clipping

The clipping unit 1750 may clip (restrict) values of the reconstructed samples, based on values of the filtered reconstructed samples (a value of a current reconstructed sample and values of neighbor reconstructed samples) and a threshold value (S1810).

The threshold value may be determined based on a bit depth of an image, etc. The encoding apparatus may encode information on the determined threshold value, and may signal the information to the decoding apparatus. The decoding apparatus may determine a threshold value to be applied to the clipping by using the decoded information on a threshold value.

Although embodiments of the present disclosure have been described for illustrative purposes, those having ordinary skill in the art should appreciate that and various modifications and changes are possible, without departing from the idea and scope of the disclosure. Embodiments have been described for the sake of brevity and clarity. Accordingly, one of ordinary skill should understand that the scope of the embodiments is not limited by the embodiments explicitly described above but includes the claims and equivalents thereto.

What is claimed is:

1. A method of predicting a current block based on a first mode, the method comprising:
    partitioning the current block into non-rectangular blocks based on a partition mode syntax element;
    determining an intra block to be intra-predicted and an inter block to be inter-predicted among the non-rectangular blocks;
    deriving inter prediction sample values of a first area including the inter block based on motion information;
    deriving intra prediction sample values of a second area including the intra block based on an intra prediction mode;
    deriving an intra weight and an inter weight to be applied to a to-be-predicted target sample by considering a distance between the target sample among samples within the current block and a partition edge of the non-rectangular blocks within the current block; and
    deriving a weighted prediction value of the target sample based on a weighted intra prediction value obtained by applying the intra weight to an intra prediction sample value of the target sample and a weighted inter prediction value obtained by applying the inter weight to an inter prediction sample value of the target sample,
    wherein deriving the intra prediction sample values of the second area comprises:
        constructing an intra prediction mode candidate list by selecting a part of total available intra prediction modes, wherein the intra prediction mode candidate list includes one or more directional modes corresponding to an angle formed by the partition edge of the non-rectangular blocks, and a number of intra prediction modes included in intra prediction mode candidate list is less than a number of the total available intra prediction modes; and
        selecting the intra prediction mode from the intra prediction mode candidate list.

2. The method of claim 1, wherein the intra block and the inter block are determined among the non-rectangular blocks based on the angle formed by the partition edge of the non-rectangular blocks and a horizontal direction of the current block.

3. The method of claim 1, wherein the intra block and the inter block are determined among the non-rectangular blocks based on a perpendicular distance from a center position of the current block to a partition edge of the non-rectangular blocks.

4. The method of claim 1,
wherein the intra prediction sample values of the intra block are derived by using the inter prediction sample values of the inter block as reference samples.

5. The method of claim 4, wherein the prediction samples of the intra block are derived by using, as reference samples, prediction samples neighboring a partition edge of the non-rectangular blocks among the prediction samples of the inter block.

6. The method of claim 1, further comprising:
determining whether to apply the first mode based on a number of intra-predicted neighbor blocks among neighbor blocks of the current block,
wherein partitioning the current block into the non-rectangular blocks is performed when it is determined that the first mode is applied.

7. The method of claim 1, wherein the intra weight and the inter weight are derived by further considering whether neighbor blocks of the current block have been inter-predicted or intra-predicted.

8. A video encoding method for predicting a current block based on a first mode, the method comprising:
partitioning the current block into non-rectangular blocks;
determining an intra block to be intra-predicted and an inter block to be inter-predicted among the non-rectangular blocks;
deriving inter prediction sample values of a first area including the inter block based on motion information;
deriving intra prediction sample values of a second area including the intra block based on an intra prediction mode; and
encoding the current block based on the inter prediction sample values of the first area and the intra prediction sample values of the second area,
wherein deriving the intra prediction sample values of the second area comprises:
constructing an intra prediction mode candidate list by selecting a part of total available intra prediction modes, wherein the intra prediction mode candidate list includes one or more directional modes corresponding to an angle formed by a partition edge of the non-rectangular blocks, and a number of intra prediction modes included in intra prediction mode candidate list is less than a number of the total available intra prediction modes; and
selecting the intra prediction mode from the intra prediction mode candidate list, and
wherein encoding the current block comprises:
deriving an intra weight and an inter weight to be applied to a to-be-predicted target sample by considering a distance between the target sample among samples within the current block and the partition edge of the non-rectangular blocks within the current block, and
deriving a weighted prediction value of the target sample based on a weighted intra prediction value obtained by applying the intra weight to an intra prediction sample value of the target sample and a weighted inter prediction value obtained by applying the inter weight to an inter prediction sample value of the target sample.

9. The method of claim 8, wherein the intra block and the inter block are determined based on the angle formed by the partition edge of the non-rectangular blocks and a horizontal direction of the current block.

10. The method of claim 8, wherein the intra block and the inter block are determined based on a perpendicular distance from a center position of the current block to a partition edge of the non-rectangular blocks.

11. The method of claim 8,
wherein the intra prediction sample values of the intra block are derived by using the inter prediction sample values of the inter block as reference samples.

12. The method of claim 11, wherein the intra prediction sample values of the intra block are derived by using, as reference samples, prediction samples neighboring the partition edge of the non-rectangular blocks among the inter prediction sample values of the inter block.

13. The method of claim 8, further comprising:
determining whether to apply the first mode based on a number of intra-predicted neighbor blocks among neighbor blocks of the current block,
wherein the current block is partitioned into the non-rectangular blocks when it is determined that the first mode is applied.

14. The method of claim 8, wherein the intra weight and the inter weight are derived by further considering whether neighbor blocks of the current block are inter-predicted or intra-predicted.

15. A method for transmitting a bitstream containing encoded video data, the method comprising:
generating the bitstream by encoding a current block; and
transmitting the bitstream to a video decoding apparatus,
wherein generating the bitstream comprises:
partitioning the current block into non-rectangular blocks;
determining an intra block to be intra-predicted and an inter block to be inter-predicted among the non-rectangular blocks;
deriving inter prediction sample values of a first area including the inter block based on motion information;
deriving intra prediction sample values of a second area including the intra block based on an intra prediction mode; and
encoding the current block based on the inter prediction sample values of the first area and the intra prediction sample values of the second area,
wherein deriving the intra prediction sample values of the second area comprises:
constructing an intra prediction mode candidate list by selecting a part of total available intra prediction modes, wherein the intra prediction mode candidate list includes one or more directional modes corresponding to an angle formed by a partition edge of the non-rectangular blocks, and a number of intra prediction modes included in intra prediction mode candidate list is less than a number of the total available intra prediction modes; and
selecting the intra prediction mode from the intra prediction mode candidate list, and
wherein encoding the current block comprises:
deriving an intra weight and an inter weight to be applied to a to-be-predicted target sample by considering a distance between the target sample among samples within the current block and the partition edge of the non-rectangular blocks within the current block, and
deriving a weighted prediction value of the target sample based on a weighted intra prediction value obtained by applying the intra weight to an intra prediction sample value of the target sample and a weighted inter prediction value obtained by applying the inter weight to an inter prediction sample value of the target sample.

\* \* \* \* \*